(12) United States Patent
Kondo et al.

(10) Patent No.: US 10,164,546 B2
(45) Date of Patent: Dec. 25, 2018

(54) ELECTRIC POWER CONVERSION DEVICE

(71) Applicant: Mitsubishi Electric Corporation, Chiyoda-ku (JP)

(72) Inventors: Ryota Kondo, Chiyoda-ku (JP); Takaaki Takahara, Chiyoda-ku (JP); Satoshi Murakami, Chiyoda-ku (JP); Masaki Yamada, Chiyoda-ku (JP); Naohisa Uehara, Chiyoda-ku (JP); Yuuya Tanaka, Chiyoda-ku (JP); Hidehiko Kinoshita, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 163 days.

(21) Appl. No.: 14/916,345

(22) PCT Filed: Jun. 3, 2014

(86) PCT No.: PCT/JP2014/064693
§ 371 (c)(1),
(2) Date: Mar. 3, 2016

(87) PCT Pub. No.: WO2015/045485
PCT Pub. Date: Apr. 2, 2015

(65) Prior Publication Data
US 2016/0197562 A1    Jul. 7, 2016

(30) Foreign Application Priority Data
Sep. 30, 2013   (JP) .................................. 2013-203676

(51) Int. Cl.
*H02M 7/06*    (2006.01)
*H02M 7/217*   (2006.01)
*H02M 1/42*    (2007.01)

(52) U.S. Cl.
CPC ........... *H02M 7/06* (2013.01); *H02M 1/4208* (2013.01); *H02M 1/4216* (2013.01);
(Continued)

(58) Field of Classification Search
CPC ............ H02M 7/00; H02M 7/02; H02M 7/04; H02M 7/06; H02M 7/12; H02M 7/21;
(Continued)

(56) References Cited

U.S. PATENT DOCUMENTS 8,351,232 B2 *   1/2013   Zhang ................. H02M 1/4225
                                              323/283
2013/0002215 A1   1/2013   Ikeda et al.

FOREIGN PATENT DOCUMENTS

JP           2008 141901           6/2008
JP         2009095160 A    *      4/2009
(Continued)

OTHER PUBLICATIONS

English translation of JP 2009095160.*
(Continued)

*Primary Examiner* — Timothy J Dole
*Assistant Examiner* — Carlos Rivera-Perez
(74) *Attorney, Agent, or Firm* — Oblon, McClelland, Maier & Neustadt, L.L.P.

(57) ABSTRACT

An electric power conversion device which performs conversion to desired voltage using charge and discharge of a DC capacitor includes: a reactor connected to a rectification circuit; a leg part in which diodes and first and second switching elements are connected in series between positive and negative terminals of a smoothing capacitor, and to which the reactor is connected; and the DC capacitor. A control circuit performs high-frequency PWM control for the first and second switching elements using the same drive cycle, with their reference phases shifted from each other by (Continued)

a half cycle, and controls a sum and a ratio of ON periods of the first and second switching elements in one cycle, thereby allowing both high-power-factor control for input AC current and voltage control for the DC capacitor.

20 Claims, 27 Drawing Sheets

(52) U.S. Cl.
CPC ....... *H02M 1/4225* (2013.01); *H02M 7/2176* (2013.01); *Y02B 70/126* (2013.01)

(58) Field of Classification Search
CPC .... H02M 7/217; H02M 7/219; H02M 7/2176; H02M 7/155; H02M 7/1555; H02M 7/1557; H02M 7/162; H02M 7/1623; H02M 7/1626; H02M 1/42; H02M 1/4208; H02M 1/4216; H02M 1/4225; H02M 1/4233; H02M 1/4241; H02M 1/425; H02M 1/4258; H02M 3/00; H02M 3/02; H02M 3/04; H02M 3/10; H02M 3/155; H02M 3/1552; H02M 3/156; H02M 3/158; H02M 5/40; H02M 5/42; H02M 5/458; Y02B 70/12; Y02B 70/123; Y02B 70/126; Y02B 70/1466
USPC ..... 363/21.02, 21.03, 34, 35, 38, 44–48, 74, 363/79, 89, 123–127; 323/205–211, 323/222–226, 266, 271–275, 282–288, 323/299–303, 351
See application file for complete search history.

(56) References Cited

FOREIGN PATENT DOCUMENTS

| | | |
|---|---|---|
| JP | 2012 16075 | 1/2012 |
| WO | WO 2012001828 A1 * | 1/2012 ............ H02M 3/158 |

OTHER PUBLICATIONS

Combined Chinese Office Action and Search Report dated Aug. 4, 2017, in Patent Application No. 201480046994.9 (with partial English translation).
International Search Report dated Aug. 26, 2014, in PCT/JP2014/064693 Filed Jun. 3, 2014.

* cited by examiner

ELECTRIC POWER CONVERSION DEVICE

TECHNICAL FIELD

The present invention relates to an electric power conversion device to obtain desired DC voltage.

BACKGROUND ART

One of conventional electric power conversion devices is a DC/DC electric power conversion device that includes: two or more switching units each composed of two semiconductor switching elements, with the semiconductor switching elements in each switching unit being connected in series; an energy transfer capacitor for charging and discharging; and an inductor. The DC/DC electric power conversion device adjusts a ratio between input and output voltages, and the power direction, through operation in four kinds of switching modes (for example, see Patent Document 1).

CITATION LIST

Patent Document

Patent Document 1: Japanese Laid-Open Patent Publication No. 2012-016075

SUMMARY OF THE INVENTION

Problems to be Solved by the Invention

In the above conventional electric power conversion device, in the case where an AC power supply is connected on the input side, since control in accordance with the phase of the AC power supply cannot be performed, high-power-factor control for input current cannot be performed, and it is difficult to control voltage of the energy transfer capacitor to be constant.

The present invention has been made to solve the above problem, and an object of the present invention is to, in an electric power conversion device that rectifies input from an AC power supply and then performs conversion to desired voltage using charge and discharge of a DC capacitor, enable both of high-power-factor control for input current and control of making voltage of the DC capacitor constant.

Solution to the Problems

An electric power conversion device according to the present invention includes: a rectification circuit for rectifying input from an AC power supply; a switching section for stepping up voltage of output of the rectification circuit, to perform a resultant output; a smoothing capacitor for smoothing the output of the switching section; and a control circuit for controlling the switching section. The switching section includes: a reactor having a first end connected to a positive side terminal of the rectification circuit; a leg part formed by a first semiconductor element, a second semiconductor element, a first switching element, and a second switching element for each controlling conduction and block of current, which are connected in series between positive and negative terminals of the smoothing capacitor, a second end of the reactor being connected to a connection point between the second semiconductor element and the first switching element; and a DC capacitor connected between a connection point between the first semiconductor element and the second semiconductor element, and a connection point between the first switching element and the second switching element. The control circuit performs high-frequency PWM control for the switching section, thereby controlling voltage of the DC capacitor to be a command value, controlling circuit current flowing from the AC power supply via the rectification circuit so as to improve an input power factor from the AC power supply, and controlling voltage of the smoothing capacitor to be target voltage. The control circuit performs high-frequency driving of the first switching element and the second switching element using the same drive cycle, with reference phases thereof shifted from each other by a half cycle, and controls a sum of a first ON period of the first switching element in one cycle and a second ON period of the second switching element in one cycle, thereby controlling the circuit current, and controls a ratio of the first ON period and the second ON period, thereby controlling voltage of the DC capacitor.

Effect of the Invention

Owing to the above configuration, the electric power conversion device according to the present invention enables high-power-factor control for input current and control of making voltage of the DC capacitor constant, thereby reliably obtaining desired DC voltage. In addition, the capacity of the reactor and the capacity of the DC capacitor can be reduced, whereby the device configuration can be downsized.

DESCRIPTION OF EMBODIMENTS

Embodiment 1

Hereinafter, embodiment 1 of the present invention will be described.

Figure 1:
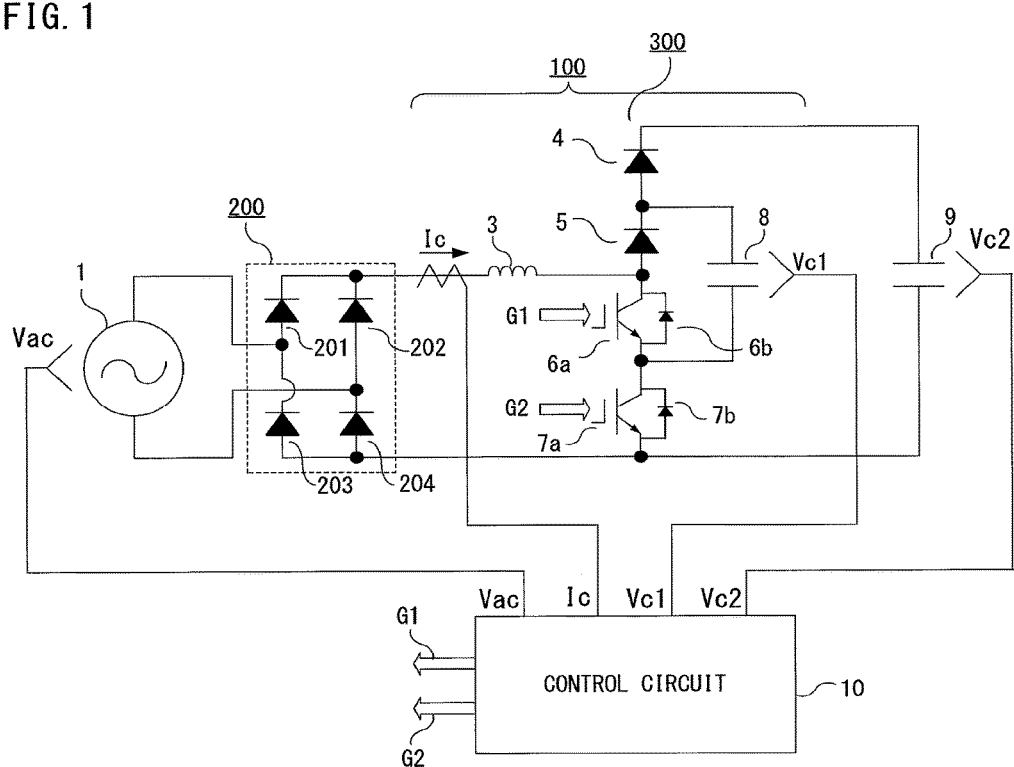
FIG. 1 is a configuration diagram of an electric power conversion device according to embodiment 1 of the present invention.

FIG. 1 is a schematic configuration diagram of an electric power conversion device according to embodiment 1 of the present invention. As shown in FIG. 1, the electric power conversion device includes a main circuit and a control circuit 10 for converting AC power of an AC power supply 1 to DC power and outputting the DC power.

The main circuit includes: a rectification circuit 200 for rectifying input from the AC power supply 1; a switching section 100 for stepping up voltage of output of the rectification circuit 200, to perform a resultant output; and a smoothing capacitor 9 for smoothing output of the switching section 100. The rectification circuit 200 is a diode rectification circuit having four diodes 201 to 204 in a full-bridge form. The switching section 100 includes: a reactor 3 which is a current limiting circuit; a diode 4 as a first semiconductor element; a diode 5 as a second semiconductor element; a first switching element 6a; a second switching element 7a; and a DC capacitor 8. The diode 4, the diode 5, the first switching element 6a, and the second switching element 7a are connected in series between positive and negative terminals of the smoothing capacitor 9, thus forming a leg part 300.

Output of the AC power supply 1 is connected to an input terminal of the rectification circuit 200. A first output terminal of the rectification circuit 200 is connected to one end of the reactor 3. A connection point between an anode terminal of the diode 5 and the first switching element 6a is connected to the other end of the reactor 3. The diode 4 is connected between a cathode terminal of the diode 5 and a positive terminal of the smoothing capacitor 9. The second switching element 7a is connected between the first switching element 6a and a negative terminal of the smoothing capacitor 9. The DC capacitor 8 is connected between the cathode terminal of the diode 5, and a connection point between the first switching element 6a and the second switching element 7a. The negative terminal of the smoothing capacitor 9 is directly connected to a second output terminal of the rectification circuit 200.

The first switching element 6a and the second switching element 7a are each composed of an IGBT (Insulated Gate Bipolar Transistor) to which a diode 6b, 7b is connected in antiparallel, respectively.

Instead of IGBT, the first switching element 6a and the second switching element 7a may be semiconductor switching elements such as a MOSFET (Metal Oxide Semiconductor Field Effect Transistor) with a diode contained between a source and a drain thereof.

Voltage sensors are provided for detecting voltage Vac of the AC power supply, voltage Vc1 of the DC capacitor 8, and voltage Vc2 of the smoothing capacitor 9, respectively, and a current sensor is provided for detecting current Ic as circuit current flowing from the AC power supply 1 via the rectification circuit 200. In this case, current flowing through the reactor 3 is detected as the current Ic.

Based on the detected DC capacitor voltage Vc1, the detected smoothing capacitor voltage Vc2, the detected AC power supply voltage Vac, and the detected current Ic, the control circuit 10 generates gate signals G1 and G2 so that the smoothing capacitor voltage Vc2 becomes target voltage Vc2* which is set constant voltage, thereby performing ON/OFF control for the first switching element 6a and the second switching element 7a, and thus performing output control for the switching section 100.

A load (not shown) is connected to the smoothing capacitor 9. In a normal state, the smoothing capacitor voltage Vc2 is lower than the target voltage Vc2*, and the control circuit 10 performs output control for the switching section 100 so as to convert AC power from the AC power supply 1 and supply the resultant DC power to the smoothing capacitor 9.

Hereinafter, operation of the electric power conversion device configured as described above will be described.

The rectification circuit 200 full-wave rectifies input power from the AC power supply 1, and the switching section 100 outputs DC power to the smoothing capacitor 9, using charge and discharge of the DC capacitor 8 through ON/OFF operation of the first switching element 6a and the second switching element 7a.

The control circuit 10 performs output control for the switching section 100 by turning on and off the first switching element 6a and the second switching element 7a through high-frequency PWM (pulse width modulation) control so as to control the current Ic so that an input power factor from the AC power supply 1 becomes almost 1, and so as to control voltage of the smoothing capacitor 9 to be the target voltage Vc2*. In this output control, the control circuit 10 adjusts a charge/discharge amount of the DC capacitor 8 to control the DC capacitor voltage Vc1 to be a constant command value Vc1*. Hereinafter, in the case of merely mentioning "current control", the current control means controlling the current Ic so that the input power factor from the AC power supply 1 becomes almost 1.

The smoothing capacitor voltage Vc2 at an output stage is higher than peak voltage of the AC power supply voltage Vac, and the switching section 100 performs step-up operation. The command value Vc1* for the DC capacitor voltage Vc1 is set to half the target voltage Vc2* for the smoothing capacitor 9.

The control circuit 10 has different control modes respectively corresponding to the case where absolute value voltage |Vac| of the AC power supply 1 is lower than the DC capacitor voltage Vc1 and the case where the absolute value voltage |Vac| is equal to or higher than the DC capacitor voltage Vc1. The control circuit 10 performs control in a first control mode for the former case, and performs control in a second control mode for the latter case. That is, in the case where the peak voltage of the AC power supply voltage Vac is equal to or higher than the DC capacitor voltage Vc1, the control circuit 10 switches between the first control mode and the second control mode at a phase where the absolute value voltage |Vac| of the AC power supply 1 is equal to the DC capacitor voltage Vc1. In the case where the peak voltage of the AC power supply voltage Vac is lower than the DC capacitor voltage Vc1, the control circuit 10 uses only the first control mode. Hereinafter, the absolute value voltage |Vac| of the AC power supply 1 is simply referred to as voltage |Vac|.

Figure 2:
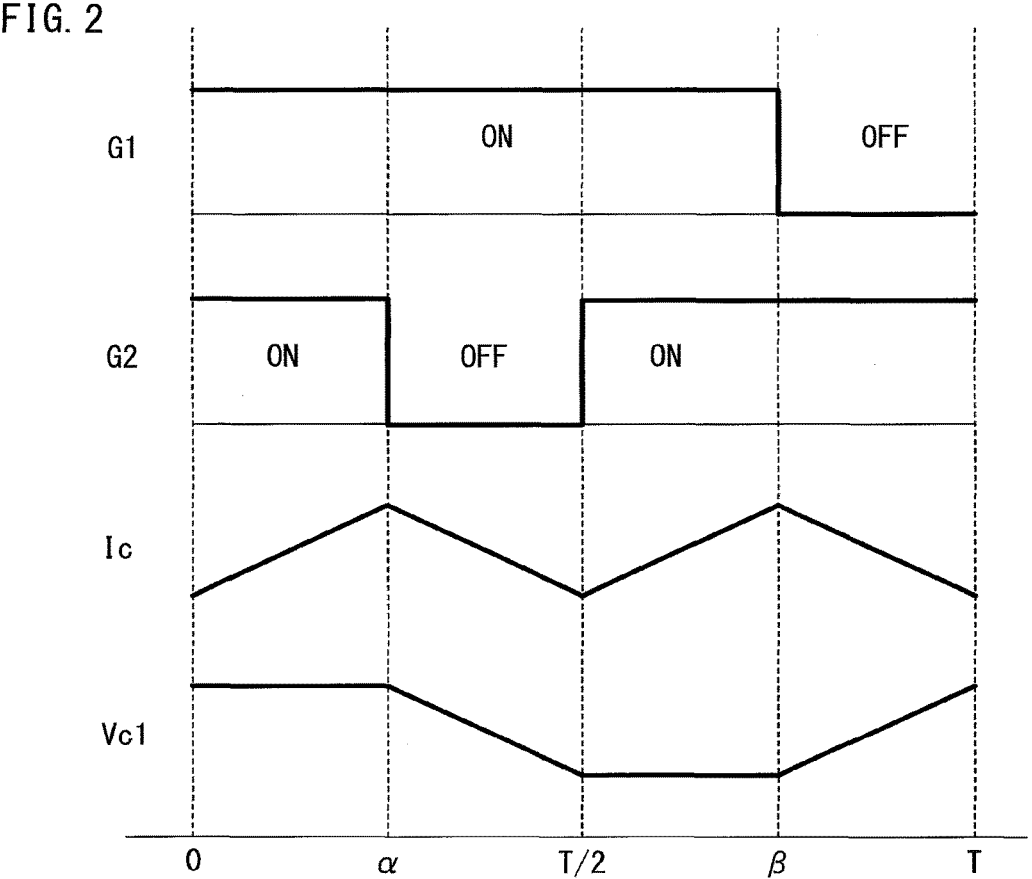
FIG. 2 is a waveform diagram of gate signals and each part in a first control mode of the electric power conversion device according to embodiment 1 of the present invention.
Figure 3:
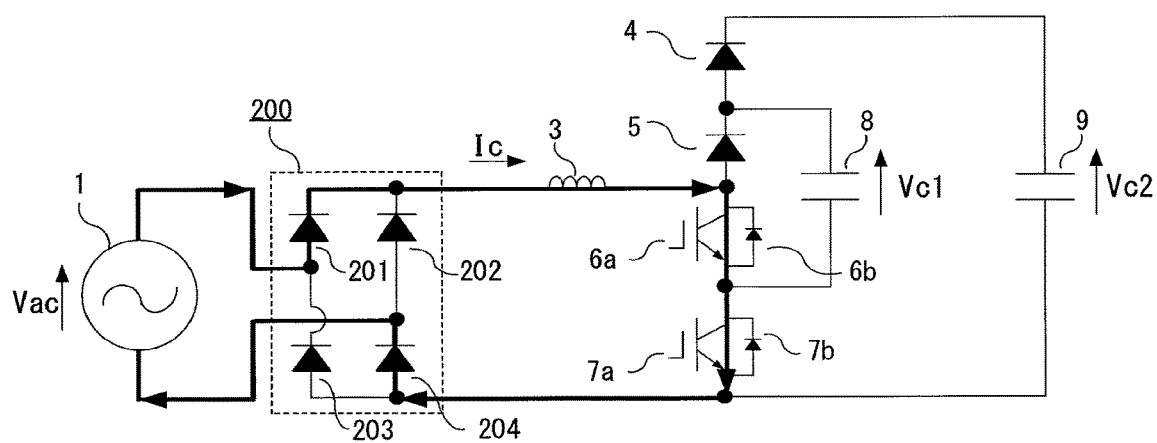
FIG. 3 is a current route diagram for explaining operation in the first control mode of the electric power conversion device according to embodiment 1 of the present invention.
Figure 4:
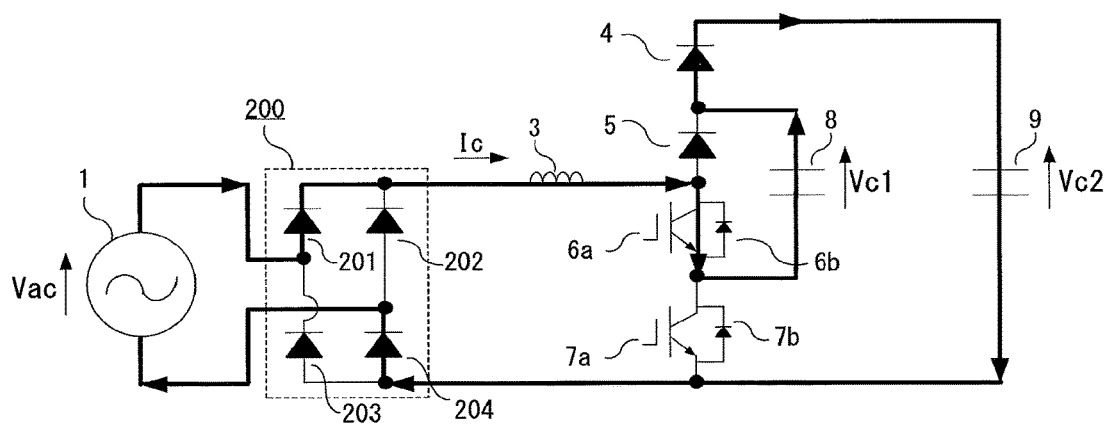
FIG. 4 is a current route diagram for explaining operation in the first control mode of the electric power conversion device according to embodiment 1 of the present invention.
Figure 5:
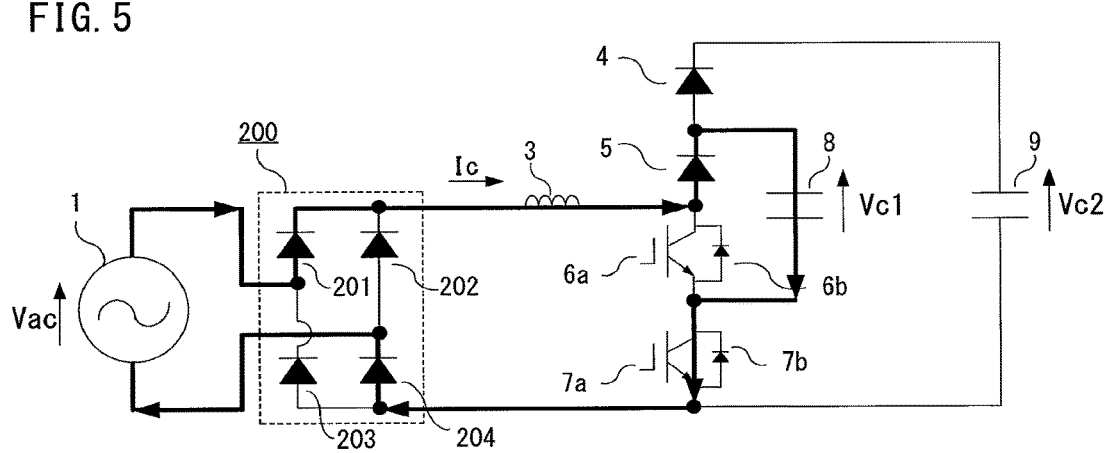
FIG. 5 is a current route diagram for explaining operation in the first control mode of the electric power conversion device according to embodiment 1 of the present invention.

FIG. 2 is a diagram showing waveforms of the gate signals G1 and G2 for the first switching element 6a and the second switching element 7a, the current Ic, and the DC capacitor voltage Vc1 in the first control mode. FIG. 3 to FIG. 5 are current route diagrams for explaining operation of the electric power conversion device in the first control mode.

Figure 6:
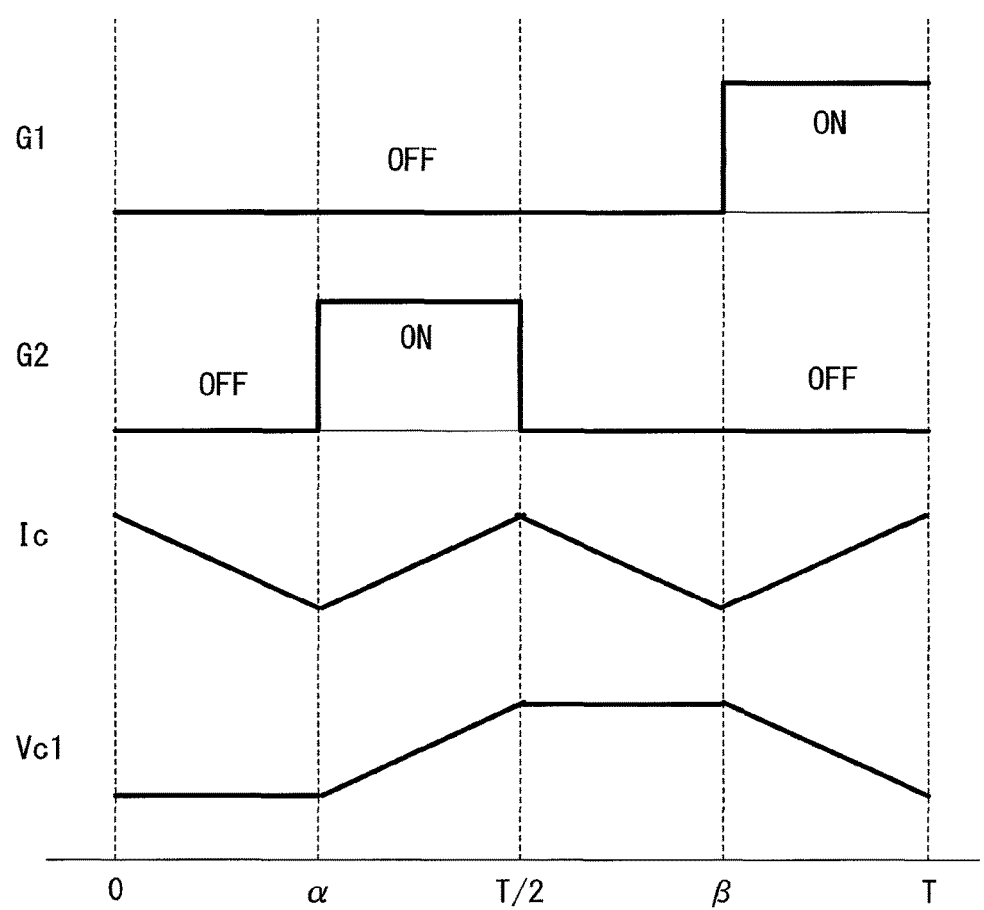
FIG. 6 is a waveform diagram of gate signals and each part in a second control mode of the electric power conversion device according to embodiment 1 of the present invention.
Figure 7:
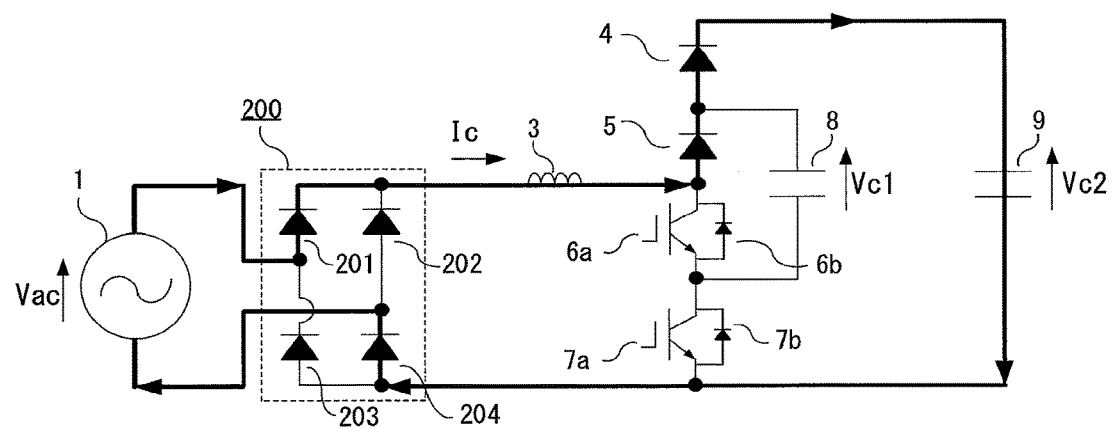
FIG. 7 is a current route diagram for explaining operation in the second control mode of the electric power conversion device according to embodiment 1 of the present invention.
Figure 8:
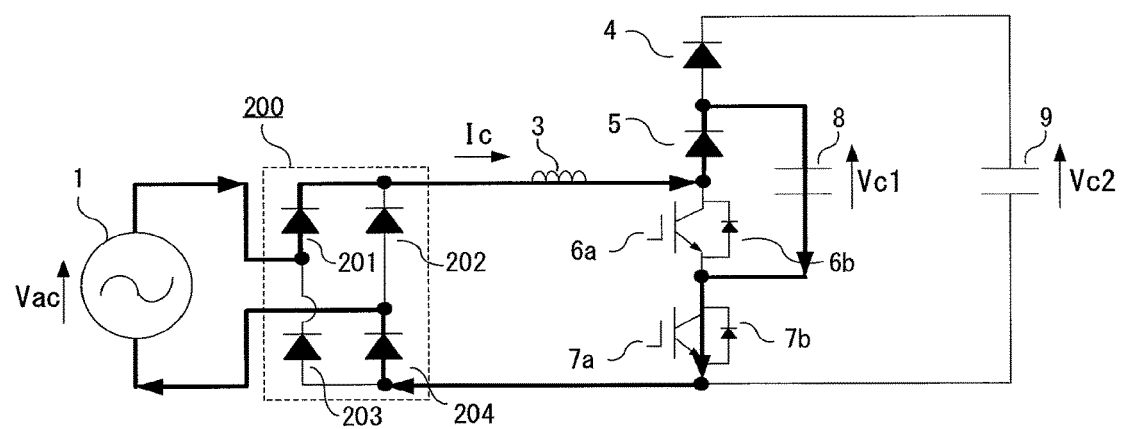
FIG. 8 is a current route diagram for explaining operation in the second control mode of the electric power conversion device according to embodiment 1 of the present invention.
Figure 9:
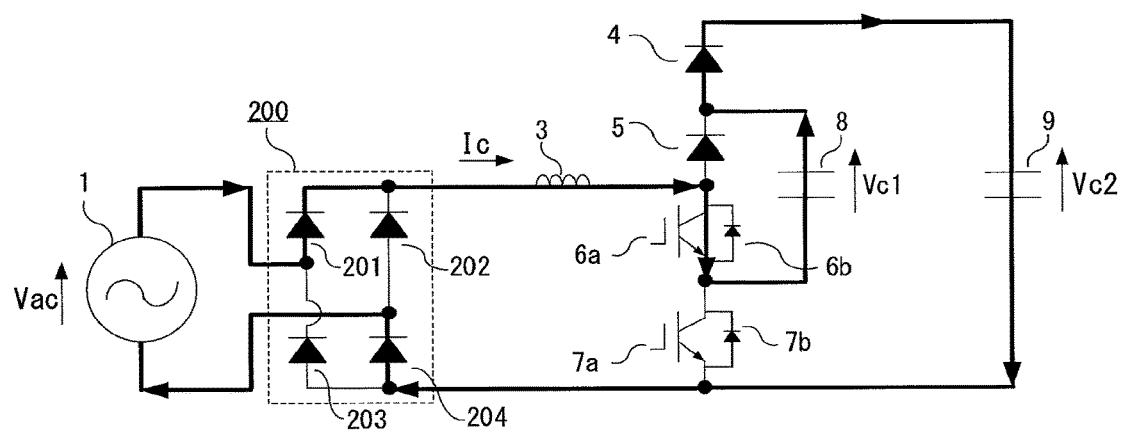
FIG. 9 is a current route diagram for explaining operation in the second control mode of the electric power conversion device according to embodiment 1 of the present invention.

FIG. 6 is a diagram showing waveforms of the gate signals G1 and G2 for the first switching element 6a and the second switching element 7a, the current Ic, and the DC capacitor voltage Vc1 in the second control mode. FIG. 7 to FIG. 9 are current route diagrams for explaining operation of the electric power conversion device in the second control mode.

As shown in FIG. 2 and FIG. 6, a drive cycle (carrier cycle) of the first switching element 6a and the second switching element 7a subjected to the high-frequency PWM control is defined as T, a first phase α is set within a half cycle from phase 0 to phase (T/2), and a second phase β is set within a half cycle from phase (T/2) to phase T. Thus, the drive cycle T is divided into four periods. FIG. 2 and FIG. 6 show ON/OFF states of the two switching elements, i.e., the first switching element 6a and the second switching element 7a, and a waveform at each part, in these four periods. A method for setting the first phase α and the second phase β will be described later.

The waveform diagrams in FIG. 2 and FIG. 6 show a state in which the smoothing capacitor voltage Vc2 is controlled to be the target voltage Vc2* and thus is constant.

First, the first control mode in the case where the voltage |Vac| is lower than the DC capacitor voltage Vc1 will be described.

As shown in FIG. 2, the first switching element 6a is turned on at phase 0 and turned off at second phase β, and the second switching element 7a is turned on at phase (T/2) and turned off at first phase α. That is, using the phase 0 as a reference phase, the first switching element 6a is turned on during a first ON period from phase 0 to second phase β, and using the phase (T/2) as a reference phase, the second switching element 7a is turned on during a second ON period from phase (T/2) to first phase α. In this case, each of the lengths of the first ON period and the second ON period is equal to or longer than the half cycle (T/2).

It should be noted that, although the period from phase (T/2) to first phase α is a combination of a period from phase 0 to first phase α and a period from phase (T/2) to phase T, these periods form a continuous period in repetitive cycles, and therefore are represented as the period from phase (T/2) to first phase α.

In a first period from phase 0 to first phase α, and a third period from phase (T/2) to second phase β, the first switching element 6a and the second switching element 7a are both ON, and the current Ic flows through a current route shown in FIG. 3. That is, the DC capacitor 8 and the smoothing capacitor 9 are bypassed, and the current Ic flowing from the AC power supply 1 via the rectification circuit 200 to the reactor 3 passes through the first switching element 6a, the second switching element 7a, and then the rectification circuit 200, to return to the AC power supply 1. At this time, the current Ic increases due to the reactor 3. Since the DC capacitor 8 is bypassed, the DC capacitor 8 is not charged or discharged, so that voltage thereof does not vary.

In a second period from phase α to phase (T/2), the first switching element 6a is ON and the second switching element 7a is OFF, and the current Ic flows through a current route shown in FIG. 4. That is, the current Ic flowing from the AC power supply 1 via the rectification circuit 200 to the reactor 3 passes through the switching element 6a, the DC capacitor 8, the diode 4, the smoothing capacitor 9, and then the rectification circuit 200 in this order, to return to the AC power supply 1. At this time, the DC capacitor 8 is discharged and the voltage Vc1 decreases. In addition, since a sum of the voltage |Vac| and the DC capacitor voltage Vc1 is lower than the smoothing capacitor voltage Vc2, the current Ic decreases due to the reactor 3.

In a fourth period from phase β to phase T, the first switching element 6a is OFF and the second switching element 7a is ON, and the current Ic flows through a current route shown in FIG. 5. That is, the smoothing capacitor 9 is bypassed, and the current Ic flowing from the AC power supply 1 via the rectification circuit 200 to the reactor 3 passes through the diode 5, the DC capacitor 8, the second switching element 7a, and then the rectification circuit 200 in this order, to return to the AC power supply 1. At this time, the DC capacitor 8 is charged and the voltage Vc1 increases. In addition, since the voltage |Vac| is lower than the DC capacitor voltage Vc1, the current Ic decreases due to the reactor 3.

Thus, by dividing each cycle of the drive cycles into four periods and combining three kinds of controls, the control circuit 10 performs ON/OFF control for the first switching element 6a and the second switching element 7a, to increase or decrease the current Ic and the DC capacitor voltage Vc1.

Next, the second control mode in the case where the voltage |Vac| is equal to or higher than the DC capacitor voltage Vc1 will be described.

As shown in FIG. 6, the first switching element 6a is turned off at phase 0 and turned on at second phase β, and the second switching element 7a is turned off at phase (T/2) and turned on at first phase α. That is, using the phase 0 as a reference phase, the first switching element 6a is turned on during a first ON period from second phase β to phase 0 (=T), and using the phase (T/2) as a reference phase, the second switching element 7a is turned on during a second ON period from first phase α to phase (T/2). In this case, each of the lengths of the first ON period and the second ON period is equal to or shorter than the half cycle (T/2).

In a first period from phase 0 to first phase α, and a third period from phase (T/2) to second phase β, the first switching element 6a and the second switching element 7a are both OFF, and the current Ic flows through a current route shown in FIG. 7. That is, the DC capacitor 8 is bypassed, and the current Ic flowing from the AC power supply 1 via the rectification circuit 200 to the reactor 3 passes through the diode 5, the diode 4, the smoothing capacitor 9, and then the rectification circuit 200 in this order, to return to the AC power supply 1. At this time, since the voltage |Vac| is lower than the smoothing capacitor voltage Vc2, the current Ic decreases due to the reactor 3. Since the DC capacitor 8 is bypassed, the DC capacitor 8 is not charged or discharged, so that voltage thereof does not vary.

In a second period from phase α to phase (T/2), the first switching element 6a is OFF and the second switching element 7a is ON, and the current Ic flows through a current route shown in FIG. 8. That is, the smoothing capacitor 9 is bypassed, and the current Ic flowing from the AC power supply 1 via the rectification circuit 200 to the reactor 3 passes through the diode 5, the DC capacitor 8, the switching element 7a, and then the rectification circuit 200 in this order, to return to the AC power supply 1. At this time, the DC capacitor 8 is charged and the voltage Vc1 increases. In addition, since the voltage |Vac| is higher than the DC capacitor voltage Vc1, the current Ic increases due to the reactor 3.

In a fourth period from phase β to phase T, the first switching element 6a is ON and the second switching element 7a is OFF, and the current Ic flows through a current route shown in FIG. 9. That is, the current Ic flowing from the AC power supply 1 via the rectification circuit 200 to the reactor 3 passes through the switching element 6a, the DC capacitor 8, the diode 4, the smoothing capacitor 9, and then the rectification circuit 200 in this order, to return to the AC power supply 1. At this time, the DC capacitor 8 is discharged and the voltage Vc1 decreases. In addition, since a sum of the voltage |Vac| and the DC capacitor voltage Vc1 is higher than the smoothing capacitor voltage Vc2, the current Ic increases due to the reactor 3.

Thus, also in the second control mode, by dividing each cycle of the drive cycles into four periods and combining three kinds of controls, the control circuit 10 performs ON/OFF control for the first switching element 6a and the second switching element 7a, to increase or decrease the current Ic and the DC capacitor voltage Vc1.

Next, a relationship between the DC capacitor voltage Vc1 and the smoothing capacitor voltage Vc2 will be described.

In the case where the DC capacitor voltage Vc1 is lower than half the smoothing capacitor voltage Vc2, in the fourth period (see FIG. 9) in the second control mode, a sum of the voltage |Vac| and the DC capacitor voltage Vc1 can become lower than the smoothing capacitor voltage Vc2, and therefore the current Ic cannot be reliably increased by the reactor 3. In the case where the DC capacitor voltage Vc1 is higher than half the smoothing capacitor voltage Vc2, in the second period (see FIG. 4) in the first control mode, a sum of the voltage |Vac| and the DC capacitor voltage Vc1 can become higher than the smoothing capacitor voltage Vc2, and therefore the current Ic cannot be reliably decreased by the reactor 3.

Accordingly, in order that the DC capacitor voltage Vc1 is controlled to be half the smoothing capacitor voltage Vc2, the command value Vc1* for the DC capacitor voltage Vc1 is set to half the target voltage Vc2* for the smoothing capacitor 9.

In the two kinds of controls in the first control mode and the second control mode shown in FIG. 2 and FIG. 6, increase/decrease adjustment of the current Ic and increase/decrease adjustment of the DC capacitor voltage Vc1 are performed by selecting one of the first phase α and the second phase β and adjusting the selected phase.

First, increase/decrease adjustment of the current Ic and increase/decrease adjustment of the DC capacitor voltage Vc1 in the first control mode will be described with reference to FIG. 2.

If the first phase α is increased to approach phase (T/2), the first period is prolonged and the second period is shortened. At this time, the second phase β is not changed. For the current Ic, an increase period is prolonged, and a decrease period is shortened. As a result, the current Ic increases. For the DC capacitor voltage Vc1, a period during which the DC capacitor voltage Vc1 does not vary is prolonged, and a decrease period is shortened. At this time, an increase period (fourth period) of the DC capacitor voltage Vc1 does not change. As a result, average voltage (hereinafter, referred to as average DC capacitor voltage Vc1) of the DC capacitor voltage Vc1 in one cycle increases.

If the second phase β is increased to approach phase T, the third period is prolonged and the fourth period is shortened. At this time, the first phase α is not changed. For the current Ic, an increase period is prolonged, and a decrease period is shortened. As a result, the current Ic increases. For the DC capacitor voltage Vc1, a period during which the DC capacitor voltage Vc1 does not vary is prolonged, and an increase period is shortened. At this time, a decrease period (second period) of the DC capacitor voltage Vc1 does not change. As a result, the average DC capacitor voltage Vc1 decreases.

If the first phase α is decreased to approach phase 0, the first period is shortened and the second period is prolonged. At this time, the second phase β is not changed. For the current Ic, an increase period is shortened, and a decrease period is prolonged. As a result, the current Ic decreases. For the DC capacitor voltage Vc1, a period during which the DC capacitor voltage Vc1 does not vary is shortened, and a decrease period is prolonged. As a result, the average DC capacitor voltage Vc1 decreases.

If the second phase β is decreased to approach phase (T/2), the third period is shortened and the fourth period is prolonged. At this time, the first phase α is not changed. For the current Ic, an increase period is shortened, and a decrease period is prolonged. As a result, the current Ic decreases. For the DC capacitor voltage Vc1, a period during which the DC capacitor voltage Vc1 does not vary is shortened, and an increase period is prolonged. As a result, the average DC capacitor voltage Vc1 increases.

That is, in the first control mode, in order to increase the current Ic, the first phase α or the second phase β is increased, to increase a sum of the first ON period and the second ON period. In order to decrease the current Ic, the first phase α or the second phase β is decreased, to decrease a sum of the first ON period and the second ON period.

Selection of the first phase α or the second phase β is performed based on the DC capacitor voltage Vc1.

In the case of increasing the current Ic, in order to increase the average DC capacitor voltage Vc1, the first phase α is selected and increased. In the case of decreasing the current Ic, in order to increase the average DC capacitor voltage Vc1, the second phase β is selected and decreased. Thus, a ratio (first ON period/second ON period) of the first ON period and the second ON period is decreased, and the average DC capacitor voltage Vc1 is increased.

In the case of increasing the current Ic, in order to decrease the average DC capacitor voltage Vc1, the second phase β is selected and increased. In the case of decreasing the current Ic, in order to decrease the average DC capacitor voltage Vc1, the first phase α is selected and decreased. Thus, the ratio (first ON period/second ON period) is increased, and the average DC capacitor voltage Vc1 is decreased.

Next, increase/decrease adjustment of the current Ic and increase/decrease adjustment of the DC capacitor voltage Vc1 in the second control mode will be described with reference to FIG. 6.

The first phase α is increased to approach phase (T/2), while the second phase β is not changed. As a result, the current Ic decreases and the average DC capacitor voltage Vc1 decreases.

The second phase β is increased to approach phase T, while the first phase α is not changed. As a result, the current Ic decreases and the average DC capacitor voltage Vc1 increases.

The first phase α is decreased to approach phase 0, while the second phase β is not changed. As a result, the current Ic increases and the average DC capacitor voltage Vc1 increases.

The second phase β is decreased to approach phase (T/2), while the first phase α is not changed. As a result, the current Ic increases and the average DC capacitor voltage Vc1 decreases.

That is, in the second control mode, in order to increase the current Ic, the first phase α or the second phase β is decreased, to increase a sum of the first ON period and the second ON period. In order to decrease the current Ic, the first phase α or the second phase β is increased, to decrease a sum of the first ON period and the second ON period.

Selection of the first phase α or the second phase β is performed based on the DC capacitor voltage Vc1.

In the case of increasing the current Ic, in order to increase the average DC capacitor voltage Vc1, the first phase α is selected. In the case of decreasing the current Ic, in order to increase the average DC capacitor voltage Vc1, the second phase β is selected. Thus, the ratio (first ON period/second ON period) is decreased, and the average DC capacitor voltage Vc1 is increased.

In the case of increasing the current Ic, in order to decrease the average DC capacitor voltage Vc1, the second phase β is selected. In the case of decreasing the current Ic, in order to decrease the average DC capacitor voltage Vc1, the first phase α is selected. Thus, the ratio (first ON period/second ON period) is increased, and the average DC capacitor voltage Vc1 is decreased.

Hereinafter, generation of the gate signals G1 and G2 for the first switching element 6a and the second switching element 7a in order to perform the control operation as described above will be described.

In this case, in order to generate the gate signal G1 for the first switching element 6a, the control circuit 10 calculates a command (β-duty command) for a duty cycle (β/T) corresponding to the second phase β by which the duty cycle of the first switching element 6a is determined. In addition, in order to generate the gate signal G2 for the second switching element 7a, the control circuit 10 calculates a command (α-duty command) for a duty cycle (α/T) corresponding to the first phase α by which the duty cycle of the second switching element 7a is determined.

As base information for calculating the β-duty command and the α-duty command, a basic duty command ΔD described below is calculated.

Figure 10:
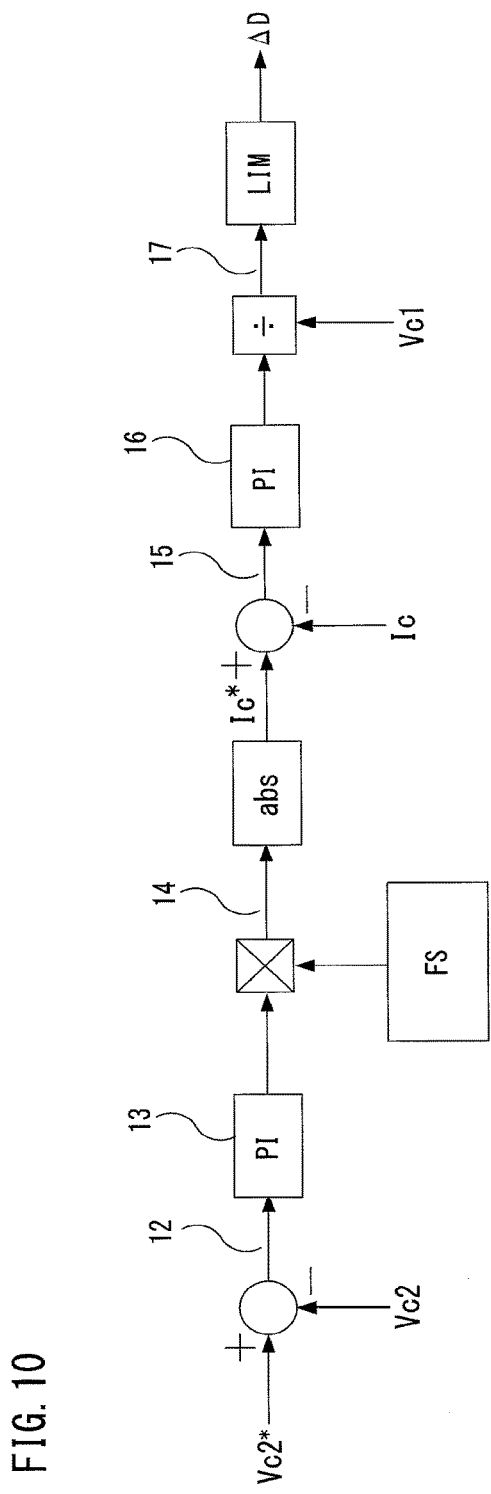
FIG. 10 is a control block diagram showing basic control in the electric power conversion device according to embodiment 1 of the present invention.

FIG. 10 is a control block diagram showing basic control in output control for the first switching element 6a and the second switching element 7a by the control circuit 10. In order to maintain the smoothing capacitor voltage Vc2 at the target voltage Vc2* and control the current Ic so that the input power factor from the AC power supply 1 is improved, a basic duty command ΔD for the first switching element 6a and the second switching element 7a is calculated.

As shown in FIG. 10, control calculation is performed by a PI controller 13 using a deviation 12 between the smoothing capacitor voltage Vc2 and the target voltage Vc2* as a feedback amount. Using output of the PI controller 13 as an amplitude target value, and using an AC power supply synchronized frequency Fs, a sinewave current command 14 is generated, and then converted to an absolute value thereof, whereby a current command Ic* synchronized with |Vac| is generated. Next, control calculation is performed by a PI controller 16 using a deviation 15 between the current command Ic* and detected current Ic as a feedback amount. Output 17 obtained by dividing output of the PI controller 16 by the DC capacitor voltage Vc1 is limited within a range of ±0.5 by a limiter, whereby the basic duty command ΔD is calculated.

The basic duty command ΔD corresponds to an adjustment amount for a selected one of the first phase α and the second phase β, and since each adjustment amount for the first phase α and the second phase β does not exceed the half cycle, the basic duty command ΔD is limited within a range of ±0.5. When ΔD is positive, the current Ic is controlled to be increased, and when ΔD is negative, the current Ic is controlled to be decreased.

Figure 11:
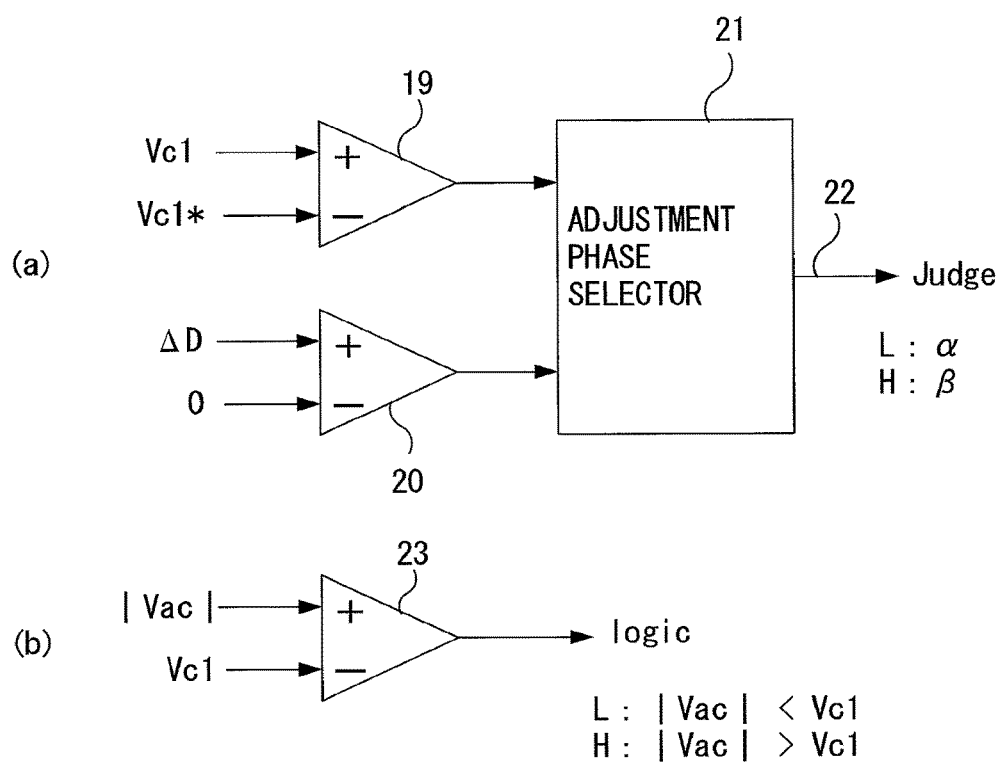
FIG. 11 is a control block diagram showing selection of an adjustment phase and a control mode in control by the electric power conversion device according to embodiment 1 of the present invention.

FIG. 11(a) is a control block diagram showing selection of an adjustment phase (first phase α/second phase β) by the control circuit 10. FIG. 11(b) is a control block diagram showing selection of a control mode (first control mode/second control mode) by the control circuit 10.

As shown in FIG. 11(a), a comparator 19 compares the DC capacitor voltage Vc1 and the command value Vc1* thereof, and a comparator 20 performs determination as to a sign of the basic duty command ΔD. Outputs of the comparators 19 and 20 are inputted to an adjustment phase selector 21. When both outputs of the comparators 19 and 20 indicate H level or indicate L level, output 22 (Judge signal) of the adjustment phase selector 21 indicates H level, and the second phase β is selected. When outputs of the comparators 19 and 20 indicate a combination of H level and L level, the output 22 (Judge signal) of the adjustment phase selector 21 indicates L level, and the first phase α is selected.

That is, in the case of Vc1≥Vc1*, if ΔD≥0, the second phase β is selected, and if ΔD<0, the first phase α is selected. In the case of Vc1<Vc1*, if ΔD≥0, the first phase α is selected, and if ΔD<0, the second phase β is selected.

As shown in FIG. 11(b), a comparator 23 compares the voltage |Vac| and the DC capacitor voltage Vc1, and outputs a logic signal for selecting a control mode. That is, if |Vac|<Vc1, the logic signal indicates L level, and the first control mode is selected. If |Vac|≥Vc1, the logic signal indicates H level, and the second control mode is selected.

Figure 12:
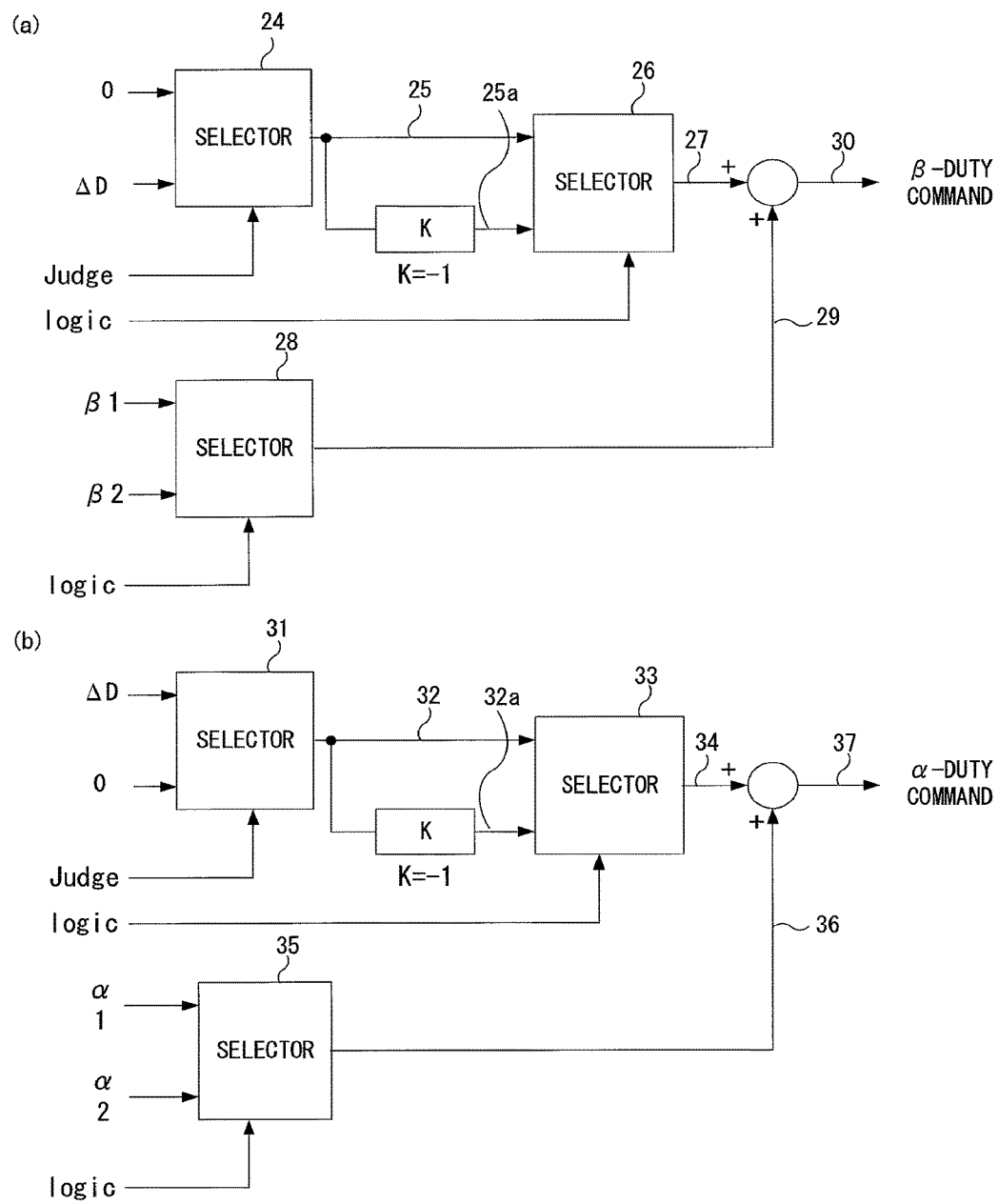
FIG. 12 is a control block diagram showing generation of a duty command for each switching element, according to embodiment 1 of the present invention.

FIG. 12 is a control block diagram showing calculation of the β-duty command and the α-duty command for determining the duty cycles of the first switching element 6a and the second switching element 7a. The β-duty command and the α-duty command are each calculated based on the Judge signal which is the output 22 of the adjustment phase selector 21, the logic signal indicating the control mode, and the calculated basic duty command ΔD.

FIG. 12(a) is a control block diagram showing calculation of the β-duty command. In this case, an initial phase of the second phase β is set so that an increase amount and a decrease amount of the current Ic in a half cycle from phase (T/2) to phase T of the drive cycle T become equal to each other. Feedforward control is performed using a duty cycle corresponding to the initial phase as initial values β1 and β2 of the β-duty command. Here, β1 is an initial value in the first control mode, and β2 is an initial value in the second control mode.

As shown in FIG. 12(a), a selector 24 outputs a signal 25 indicating zero or the basic duty command ΔD, based on the Judge signal. When the Judge signal indicates L level and the first phase α is selected, the signal 25 is zero. When the Judge signal indicates H level and the second phase β is selected, the signal 25 is the basic duty command ΔD.

Next, the polarity of the signal 25 is inverted to generate a reverse polarity signal 25a, and a selector 26 outputs one of the signal 25 and the reverse polarity signal 25a, based on the logic signal. When the logic signal indicates L level and the first control mode is selected, output 27 of the selector 26 is the signal 25. When the logic signal indicates H level and the second control mode is selected, output 27 of the selector 26 is the reverse polarity signal 25a.

Meanwhile, a selector 28 outputs one of the initial values β1 and β2, based on the logic signal. When the logic signal indicates L level (the first control mode is selected), output 29 of the selector 28 is the initial value β1. When the logic signal indicates H level (the second control mode is selected), output 29 of the selector 28 is the initial value β2. The output 29 is added as a feedforward term to the output 27 of the selector 26, whereby a β-duty command 30 is generated.

FIG. 12(b) indicates a control block diagram showing calculation of the α-duty command. In this case, an initial phase of the first phase α is set so that an increase amount and a decrease amount of the current Ic in a half cycle from phase 0 to phase (T/2) of the drive cycle T become equal to each other. Feedforward control is performed using a duty cycle corresponding to the initial phase as initial values α1 and α2 of the α-duty command. Here, α1 is an initial value in the first control mode, and α2 is an initial value in the second control mode.

As shown in FIG. 12(b), a selector 31 outputs a signal 32 indicating the basic duty command ΔD or zero, based on the Judge signal. When the Judge signal indicates L level and the first phase α is selected, the signal 32 is the basic duty command ΔD. When the Judge signal indicates H level and the second phase β is selected, the signal 32 is zero.

Next, the polarity of the signal 32 is inverted to generate a reverse polarity signal 32a, and a selector 33 outputs one of the signal 32 and the reverse polarity signal 32a, based on the logic signal. When the logic signal indicates L level and the first control mode is selected, output 34 of the selector 33 is the signal 32. When the logic signal indicates H level and the second control mode is selected, output 34 of the selector 33 is the reverse polarity signal 32a.

Meanwhile, a selector 35 outputs one of the initial values α1 and α2, based on the logic signal. When the logic signal indicates L level (the first control mode is selected), output 36 of the selector 35 is the initial value α1. When the logic signal indicates H level (the second control mode is selected), output 36 of the selector 35 is the initial value α2. The output 36 is added as a feedforward term to the output 34 of the selector 33, whereby an α-duty command 37 is generated.

Thus, the β-duty command 30 and the α-duty command 37 are calculated.

In the first control mode, when the second phase β is selected as the adjustment phase, the β-duty command 30 is generated by adding the basic duty command ΔD to the initial value β1, and the α-duty command 37 becomes the initial value α1. In the first control mode, when the first phase α is selected as the adjustment phase, the β-duty command 30 becomes the initial value β1, and the α-duty command 37 is generated by adding the basic duty command ΔD to the initial value α1.

In the second control mode, when the second phase β is selected as the adjustment phase, the β-duty command 30 is generated by adding a polarity inverted value of the basic duty command ΔD to the initial value β2, and the α-duty command 37 becomes the initial value α2. In the second control mode, when the first phase α is selected as the adjustment phase, the β-duty command 30 becomes the initial value β2, and the α-duty command 37 is generated by adding a polarity inverted value of the basic duty command ΔD to the initial value α2.

Next, the initial values β1 and β2 and the initial values α1 and α2 used in the feedforward control shown in FIG. 12 will be described.

The initial values β1 and β2 for determining the second phase β at which the first switching element 6a is turned on or off are set so that an increase amount and a decrease amount of the current Ic in a half cycle from phase (T/2) to phase T of the drive cycle T become equal to each other, as described above.

First, the first control mode in the case where the voltage |Vac| is lower than the DC capacitor voltage Vc1 will be described.

In a half cycle from phase (T/2) to phase T, an increase period of the current Ic is the third period (from phase (T/2) to second phase β). Therefore, a current increase amount Iup in the half cycle is represented by the following Expression (1), where L is a reactor capacity of the reactor 3.

$$I_{up}=(|Vac|/L) \cdot (\beta-(T/2)) \quad \text{Expression (1)}$$

In a half cycle from phase (T/2) to phase T, a decrease period of the current Ic is the fourth period (from second phase β to phase T). Therefore, a current decrease amount Idown in the half cycle is represented by the following Expression (2).

$$I_{down}=((Vc1-|Vac|)/L) \cdot (T-\beta) \quad \text{Expression (2)}$$

When the current increase amount Iup and the current decrease amount Idown are equal to each other, the following Expression (3) is satisfied.

$$I_{up}=I_{down} \quad \text{Expression (3)}$$

The value of (β/T) in this case is the initial value β1. From Expressions (1) to (3), the following Expression (4) is obtained.

$$\beta 1=(\beta/T)=(2Vc1-|Vac|)/2Vc1 \quad \text{Expression (4)}$$

Next, the second control mode in the case where the voltage |Vac| is equal to or higher than the DC capacitor voltage Vc1 will be described.

In a half cycle from phase (T/2) to phase T, an increase period of the current Ic is the fourth period (from second phase β to phase T). Therefore, a current increase amount Iup in the half cycle is represented by the following Expression (5), where Vc2 is the smoothing capacitor voltage.

$$Iup=((|Vac|+Vc1-Vc2)/L)\cdot(T-\beta) \quad \text{Expression (5)}$$

In a half cycle from phase (T/2) to phase T, a decrease period of the current Ic is the third period (from phase (T/2) to second phase β). Therefore, a current decrease amount Idown in the half cycle is represented by the following Expression (6).

$$Idown=((Vc2-|Vac|)/L)\cdot(\beta-(T/2)) \quad \text{Expression (6)}$$

When the current increase amount Iup and the current decrease amount Idown are equal to each other, the following Expression (7) is satisfied.

$$Iup=Idown \quad \text{Expression (7)}$$

The value of (β/T) in this case is the initial value β2. From Expressions (5) to (7), the following Expression (8) is obtained.

$$\beta2=(\beta/T)=(|Vac|+2Vc1-Vc2)/2Vc1 \quad \text{Expression (8)}$$

The initial values α1 and α2 for determining the first phase α at which the second switching element 7a is turned on or off are set so that an increase amount and a decrease amount of the current Ic in a half cycle from phase 0 to phase (T/2) of the drive cycle T become equal to each other, as described above.

First, the first control mode in the case where the voltage |Vac| is lower than the DC capacitor voltage Vc1 will be described.

In a half cycle from phase 0 to phase (T/2), an increase period of the current Ic is the first period (from phase 0 to first phase α). Therefore, a current increase amount Iup in the half cycle is represented by the following Expression (9).

$$Iup=(|Vac|/L)\cdot\alpha \quad \text{Expression (9)}$$

In a half cycle from phase 0 to phase (T/2), a decrease period of the current Ic is the second period (from first phase α to phase (T/2)). Therefore, a current decrease amount Idown in the half cycle is represented by the following Expression (10).

$$Idown=((Vc2-|Vac|-Vc1)/L)\cdot((T/2)-\alpha) \quad \text{Expression (10)}$$

When the current increase amount Iup and the current decrease amount Idown are equal to each other, the following Expression (11) is satisfied.

$$Iup=Idown \quad \text{Expression (11)}$$

The value of (α/T) in this case is the initial value α1. From Expressions (9) to (11), the following Expression (12) is obtained.

$$\alpha1=(\alpha/T)=(Vc2-|Vac|-Vc1)/2(Vc2-Vc1) \quad \text{Expression (12)}$$

Next, the second control mode in the case where the voltage |Vac| is equal to or higher than the DC capacitor voltage Vc1 will be described.

In a half cycle from phase 0 to phase (T/2), an increase period of the current Ic is the second period (from first phase α to phase (T/2)). Therefore, a current increase amount Iup in the half cycle is represented by the following Expression (13).

$$Iup=((|Vac|-Vc1)/L)\cdot((T/2)-\alpha) \quad \text{Expression (13)}$$

In a half cycle from phase 0 to phase (T/2), a decrease period of the current Ic is the first period (from phase 0 to second phase α). Therefore, a current decrease amount Idown in the half cycle is represented by the following Expression (14).

$$Idown=((Vc2-|Vac|)/L)\cdot\alpha \quad \text{Expression (14)}$$

When the current increase amount Iup and the current decrease amount Idown are equal to each other, the following Expression (15) is satisfied.

$$Iup=Idown \quad \text{Expression (15)}$$

The value of (α/T) in this case is the initial value α2. From Expressions (13) to (15), the following Expression (16) is obtained.

$$\alpha2=(\alpha/T)=(|Vac|-Vc1)/2(Vc2-Vc1) \quad \text{Expression (16)}$$

Figure 13:
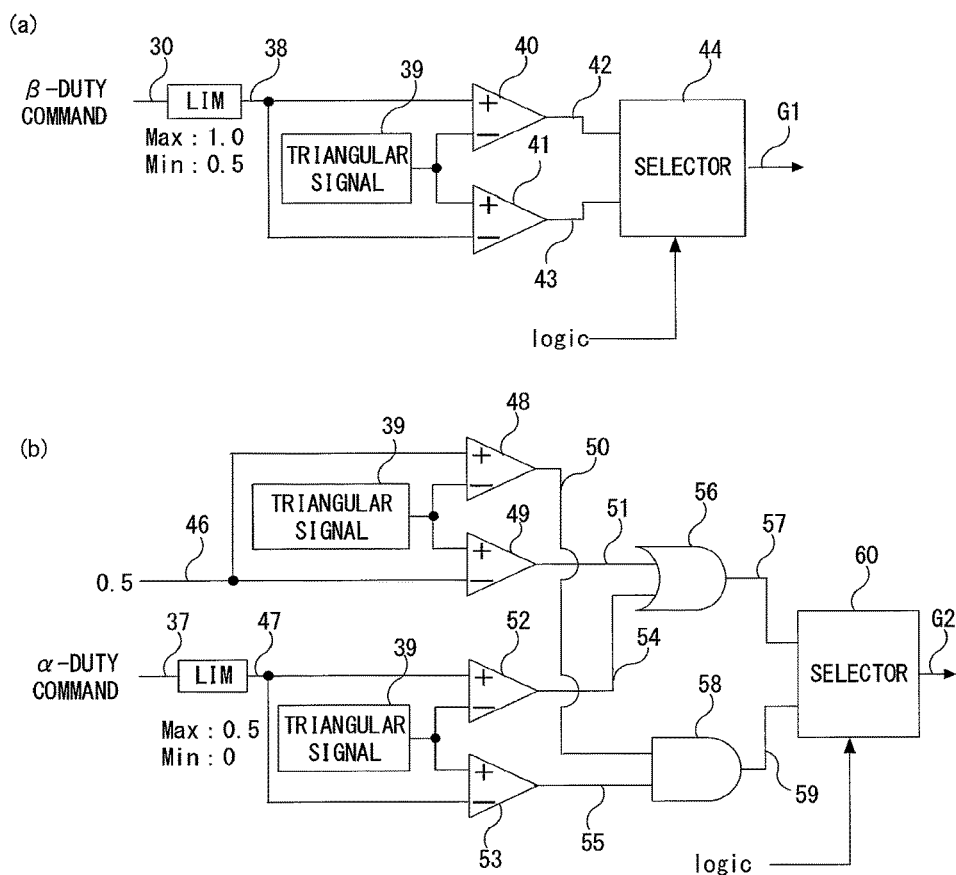
FIG. 13 is a control block diagram showing generation of a gate signal for each switching element, according to embodiment 1 of the present invention.

FIG. 13 is a control block diagram showing generation of the gate signals G1 and G2 for the first switching element 6a and the second switching element 7a based on the β-duty command and the α-duty command.

Figure 14:
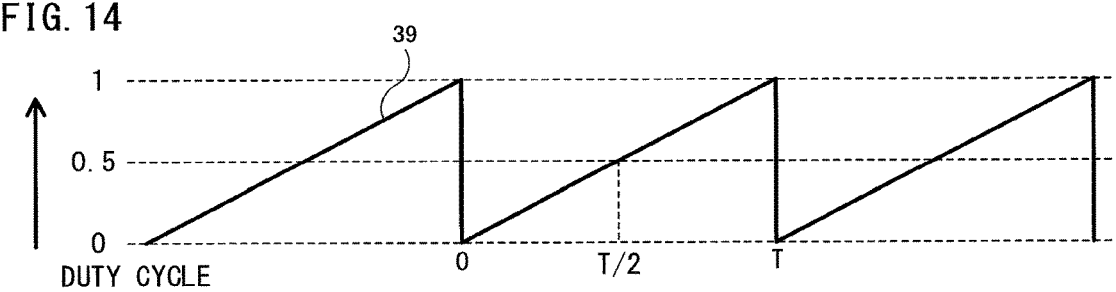
FIG. 14 is a diagram showing a triangular wave used for generation of the gate signal for each switching element, according to embodiment 1 of the present invention.

FIG. 13(a) is a control block diagram showing generation of the gate signal G1 for the first switching element 6a. First, a value 38 obtained by limiting the calculated β-duty command 30 within a range of 0.5 to 1.0 by a limiter is inputted to a positive terminal of a comparator 40 and a negative terminal of a comparator 41. In addition, a triangular wave signal 39 for PWM control is inputted to a negative terminal of the comparator 40 and a positive terminal of the comparator 41. As shown in FIG. 14, the triangular wave signal 39 is a carrier wave with the cycle T, and the duty cycle is 0 at phase 0 and is 1 at phase T.

Output signals 42 and 43 from the comparators 40 and 41 are inputted to a selector 44. Then, based on the logic signal, one of the output signals 42 and 43 is outputted as the gate signal G1 from the selector 44. When the logic signal indicates L level and the first control mode is selected, the gate signal G1 is the output signal 42 and indicates H level during a period from phase 0 to second phase β. When the logic signal indicates H level and the second control mode is selected, the gate signal G1 is the output signal 43 and indicates H level during a period from second phase β to phase T.

FIG. 13(b) is a control block diagram showing generation of the gate signal G2 for the second switching element 7a.

A duty command signal 46 indicating 0.5 is inputted to a positive terminal of a comparator 48 and a negative terminal of a comparator 49. In addition, the triangular wave signal 39 is inputted to a negative terminal of the comparator 48 and a positive terminal of the comparator 49.

Meanwhile, a value 47 obtained by limiting the calculated α-duty command 37 within a range of 0 to 0.5 by a limiter is inputted to a positive terminal of a comparator 52 and a negative terminal of a comparator 53. In addition, the triangular wave signal 39 is inputted to a negative terminal of the comparator 52 and a positive terminal of the comparator 53.

Output 51 of the comparator 49 and output 54 of the comparator 52 are inputted to an OR operation element 56. Output 50 of the comparator 48 and output 55 of the comparator 53 are inputted to an AND operation element 58.

An output signal 57 from the OR operation element 56 and an output signal 59 from the AND operation element 58 are inputted to a selector 60, and based on the logic signal, one of the output signals 57 and 59 is outputted therefrom as the gate signal G2. When the logic signal indicates L level and the first control mode is selected, the gate signal G2 is the output signal 57 and indicates H level during a period from phase (T/2) to first phase α. When the logic signal indicates H level and the second control mode is selected, the gate signal G1 is the output signal 59 and indicates H level during a period from first phase α to phase (T/2).

The control circuit 10 thus generates the gate signals G1 and G2, to control the first switching element 6a and the second switching element 7a.

Next, switching between the first control mode and the second control mode will be described. The switching of the control mode is performed at an AC power supply phase where the voltage |Vac| is equal to the DC capacitor voltage Vc1, using the logic signal. At this time, an ON/OFF state of each of the first switching element 6a and the second switching element 7a is to be inverted.

At the time of switching of the control mode, |Vac|=Vc1 is satisfied.

Therefore, from the above Expressions (4) and (8), the initial values β1 and β2 of the β-duty command are as follows.

$$\beta1=\beta2=\tfrac{1}{2}$$

In addition, from the above Expressions (12) and (16), the initial values α1 and α2 of the α-duty command are as follows.

$$\alpha1=\alpha2=0$$

Here, the DC capacitor voltage Vc1 is assumed to be half the smoothing capacitor voltage Vc2.

Thus, when the control is switched between the first control mode and the second control mode based on change in the AC power supply voltage Vac, either the initial value β1 (=β2) of the β-duty command or the initial value α1 (=α2) of the α-duty command does not change. Therefore, the control mode can be switched by simply inverting the ON/OFF state of each of the first switching element 6a and the second switching element 7a. Thus, the control calculation can be switched easily and fast.

As described above, using the current command Ic*, the control circuit 10 adjusts the β-duty command and the α-duty command corresponding to the duty cycles of the first switching element 6a and the second switching element 7a, thereby controlling the switching section 100 so as to control the DC voltage Vc2 of the smoothing capacitor 9 to be the target voltage Vc2* and so as to improve the input power factor from the AC power supply 1.

The control circuit 10 generates and adjusts the β-duty command and the α-duty command individually, thereby controlling a sum and a ratio of the first ON period of the first switching element 6a and the second ON period of the second switching element 7a in one cycle. Thus, while the current control is performed so as to improve the input power factor from the AC power supply 1, charge and discharge of the DC capacitor 8 can be controlled so as to cause the voltage Vc1 to follow the command value Vc1*.

In the reactor 3, current is increased or decreased at a frequency that is twice as high as a drive frequency for the first switching element 6a and the second switching element 7a. Therefore, the required reactor capacity can be reduced and downsized.

Each charge/discharge period of the DC capacitor 8 is equal to or shorter than half the drive cycle T, and the charge or discharge is performed at a frequency that is twice as high as the drive frequency for the first switching element 6a and the second switching element 7a. Therefore, the required capacitor capacity can be reduced and the DC capacitor 8 can also be downsized.

The switching section 100 has a configuration obtained by adding the first switching element 6a, the diode 5, and the DC capacitor 8 to a normal chopper-configuration circuit.

Thus, voltage applied to the reactor 3 can be reduced to a difference voltage between the smoothing capacitor voltage Vc2 and the DC capacitor voltage Vc1, or to the DC capacitor voltage Vc1, whereby loss reduction, downsizing, and weight reduction of the reactor 3 can be achieved. Voltages applied to the first switching element 6a and the second switching element 7a are also reduced to the difference voltage between the smoothing capacitor voltage Vc2 and the DC capacitor voltage Vc1, or to the DC capacitor voltage Vc1. Therefore, efficiency improvement can be achieved by reduction in switching loss, and downsizing of the electric power conversion device can be achieved by simplification of heat dissipation structure. A noise generation amount can also be reduced, and therefore downsizing of the electric power conversion device can be further promoted by simplification of a filter circuit.

The control circuit 10 is provided with different control modes depending on the magnitude relationship between the AC power supply voltage Vac and the DC capacitor voltage Vc1. Therefore, power factor correction control can be realized over a wide voltage range of the AC power supply voltage Vac.

The control logics of the first switching element 6a and the second switching element 7a are set to be inverted depending on the magnitude relationship between the AC power supply voltage Vac and the DC capacitor voltage Vc1. Therefore, switching of the control mode at a phase where the magnitude relationship between the AC power supply voltage Vac and the DC capacitor voltage Vc1 is reversed is simplified, whereby current controllability can be improved.

In control of the β-duty command and the α-duty command for the first switching element 6a and the second switching element 7a, the initial values thereof are set and used as the feedforward amounts. At this time, based on the DC capacitor voltage Vc1 and the current Ic, the basic duty command ΔD is reflected in only a selected one of the β-duty command and the α-duty command, while the other one is fixed at the initial value. Thus, a sum and a ratio of the first ON period of the first switching element 6a and the second ON period of the second switching element 7a in one cycle can be swiftly controlled, and also in switching of the control mode, the control is prevented from being delayed by a response time of the feedback control, whereby fast control can be achieved.

Embodiment 2

Next, embodiment 2 of the present invention will be described.

In the present embodiment 2, the main circuit and the control circuit 10 as in the above embodiment 1 shown in FIG. 1 are provided, and the control circuit 10 generates gate signals G1a and G2a different from those in the above embodiment 1, thereby performing output control for the switching section 100.

Also in this case, based on the detected DC capacitor voltage Vc1, the detected smoothing capacitor voltage Vc2, the detected AC power supply voltage Vac, and the detected current Ic, the control circuit 10 performs output control for the switching section 100 by turning on and off the first switching element 6a and the second switching element 7a through high-frequency PWM control so as to control the current Ic so that an input power factor from the AC power supply 1 becomes almost 1, and so as to control voltage of the smoothing capacitor 9 to be the target voltage Vc2*. In addition, the control circuit 10 adjusts a charge/discharge amount of the DC capacitor 8 to control the DC capacitor voltage Vc1 to be a constant command value Vc1*.

The smoothing capacitor voltage Vc2 is higher than peak voltage of the AC power supply voltage Vac, and the command value Vc1* for the DC capacitor voltage Vc1 is set to half the target voltage Vc2* for the smoothing capacitor 9.

In the case where the voltage |Vac| is lower than the DC capacitor voltage Vc1, the control circuit 10 performs control in the first control mode, and in the case where the voltage |Vac| is equal to or higher than the DC capacitor voltage Vc1, the control circuit 10 performs control in the second control mode. Hereinafter, the first control mode and the second control mode in embodiment 2 will be described based on FIG. 15 and FIG. 16.

Figure 15:
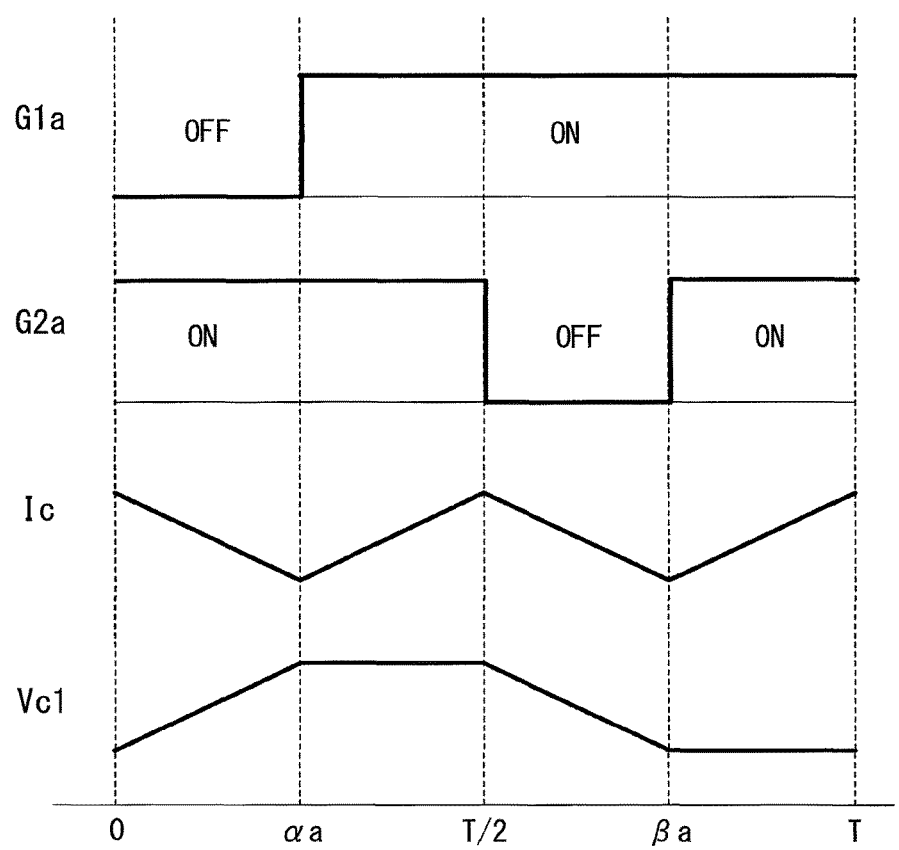
FIG. 15 is a waveform diagram of gate signals and each part in a first control mode of an electric power conversion device according to embodiment 2 of the present invention.
Figure 16:
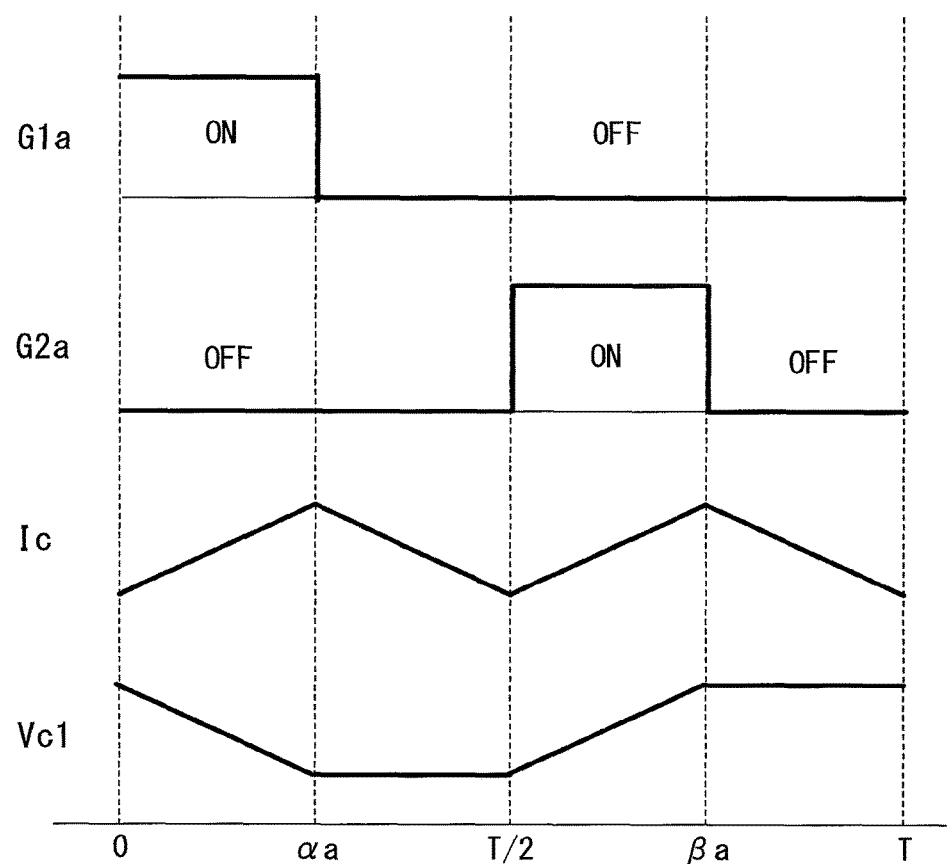
FIG. 16 is a waveform diagram of gate signals and each part in a second control mode of the electric power conversion device according to embodiment 2 of the present invention.

FIG. 15 is a diagram showing waveforms of the gate signals G1*a* and G2*a* for the first switching element 6*a* and the second switching element 7*a*, the current Ic, and the DC capacitor voltage Vc1 in the first control mode. FIG. 16 is a diagram showing waveforms of the gate signals G1*a* and G2*a* for the first switching element 6*a* and the second switching element 7*a*, the current Ic, and the DC capacitor voltage Vc1 in the second control mode.

As shown in FIG. 15 and FIG. 16, a drive cycle (carrier cycle) of the first switching element 6*a* and the second switching element 7*a* subjected to the high-frequency PWM control is defined as T, a first phase αa is set within a half cycle from phase 0 to phase (T/2), and a second phase βa is set within a half cycle from phase (T/2) to phase T. Thus, the drive cycle T is divided into four periods. FIG. 15 and FIG. 16 show ON/OFF states of the two switching elements, i.e., the first switching element 6*a* and the second switching element 7*a*, and a waveform at each part, in these four periods. A method for setting the first phase αa and the second phase βa will be described later.

The waveform diagrams in FIG. 15 and FIG. 16 show a state in which the smoothing capacitor voltage Vc2 is controlled to be the target voltage Vc2* and thus is constant.

First, the first control mode in the case where the voltage |Vac| is lower than the DC capacitor voltage Vc1 will be described.

As shown in FIG. 15, the first switching element 6*a* is turned off at phase 0 and turned on at first phase αa, and the second switching element 7*a* is turned off at phase (T/2) and turned on at second phase βa. That is, using the phase 0 as a reference phase, the first switching element 6*a* is turned on during a first ON period (from first phase αa to phase 0 (=T)) to phase 0, and using the phase (T/2) as a reference phase, the second switching element 7*a* is turned on during a second ON period (second phase βa to phase (T/2)) to phase (T/2). In this case, each of the lengths of the first ON period and the second ON period is equal to or longer than the half cycle (T/2).

It should be noted that, although the period from second phase βa to phase (T/2) is a combination of a period from second phase βa to phase T and a period from phase 0 to phase (T/2), these periods form a continuous period in repetitive cycles, and therefore are represented as the period from second phase βa to phase (T/2).

For the description of operation of the electric power conversion device in the first control mode, the current route diagrams shown in FIG. 3 to FIG. 5 in the above embodiment 1 will be used.

In a first period from phase 0 to first phase αa, the first switching element 6*a* is OFF and the second switching element 7*a* is ON, and the current Ic flows through the current route shown in FIG. 5. That is, the smoothing capacitor 9 is bypassed, and the current Ic flowing from the AC power supply 1 via the rectification circuit 200 to the reactor 3 passes through the diode 5, the DC capacitor 8, the second switching element 7*a*, and then the rectification circuit 200 in this order, to return to the AC power supply 1. At this time, the DC capacitor 8 is charged and the voltage Vc1 increases. In addition, since the voltage |Vac| is lower than the DC capacitor voltage Vc1, the current Ic decreases due to the reactor 3.

In a second period from first phase αa to phase (T/2), and a fourth period from second phase βa to phase T, the first switching element 6*a* and the second switching element 7*a* are both ON, and the current Ic flows through the current route shown in FIG. 3. That is, the DC capacitor 8 and the smoothing capacitor 9 are bypassed, and the current Ic flowing from the AC power supply 1 via the rectification circuit 200 to the reactor 3 passes through the first switching element 6*a*, the second switching element 7*a*, and then the rectification circuit 200, to return to the AC power supply 1. At this time, the current Ic increases due to the reactor 3. Since the DC capacitor 8 is bypassed, the DC capacitor 8 is not charged or discharged, so that voltage thereof does not vary.

In a third period from phase (T/2) to second phase βa, the first switching element 6*a* is ON and the second switching element 7*a* is OFF, and the current Ic flows through the current route shown in FIG. 4. That is, the current Ic flowing from the AC power supply 1 via the rectification circuit 200 to the reactor 3 passes through the switching element 6*a*, the DC capacitor 8, the diode 4, the smoothing capacitor 9, and then the rectification circuit 200 in this order, to return to the AC power supply 1. At this time, the DC capacitor 8 is discharged and the voltage Vc1 decreases. In addition, since a sum of the voltage |Vac| and the DC capacitor voltage Vc1 is lower than the smoothing capacitor voltage Vc2, the current Ic decreases due to the reactor 3.

Thus, by dividing each cycle of the drive cycles into four periods and combining three kinds of controls, the control circuit 10 performs ON/OFF control for the first switching element 6*a* and the second switching element 7*a*, to increase or decrease the current Ic and the DC capacitor voltage Vc1.

Next, the second control mode in the case where the voltage |Vac| is equal to or higher than the DC capacitor voltage Vc1 will be described.

As shown in FIG. 16, the first switching element 6*a* is turned on at phase 0 and turned off at first phase αa, and the second switching element 7*a* is turned on at phase (T/2) and turned off at second phase βa. That is, using the phase 0 as a reference phase, the first switching element 6*a* is turned on during a first ON period from phase 0 to first phase αa, and using the phase (T/2) as a reference phase, the second switching element 7*a* is turned on during a second ON period from phase (T/2) to second phase βa. In this case, each of the lengths of the first ON period and the second ON period is equal to or shorter than the half cycle (T/2).

For the description of operation of the electric power conversion device in the second control mode, the current route diagrams shown in FIG. 7 to FIG. 9 in the above embodiment 1 will be used.

In a first period from phase 0 to first phase αa, the first switching element 6*a* is ON and the second switching element 7*a* is OFF, and the current Ic flows through the current route shown in FIG. 9. That is, the current Ic flowing from the AC power supply 1 via the rectification circuit 200 to the reactor 3 passes through the switching element 6*a*, the DC capacitor 8, the diode 4, the smoothing capacitor 9, and then the rectification circuit 200 in this order, to return to the AC power supply 1. At this time, the DC capacitor 8 is discharged and the voltage Vc1 decreases. In addition, since a sum of the voltage |Vac| and the DC capacitor voltage Vc1 is higher than the smoothing capacitor voltage Vc2, the current Ic increases due to the reactor 3.

In a second period from first phase αa to phase (T/2), and a fourth period from second phase βa to phase T, the first switching element 6a and the second switching element 7a are both OFF, and the current Ic flows through the current route shown in FIG. 7. That is, the DC capacitor 8 is bypassed, and the current Ic flowing from the AC power supply 1 via the rectification circuit 200 to the reactor 3 passes through the diode 5, the diode 4, the smoothing capacitor 9, and then the rectification circuit 200 in this order, to return to the AC power supply 1. At this time, since the voltage |Vac| is lower than the smoothing capacitor voltage Vc2, the current Ic decreases due to the reactor 3. Since the DC capacitor 8 is bypassed, the DC capacitor 8 is not charged or discharged, so that voltage thereof does not vary.

In a third period from phase (T/2) to second phase βa, the first switching element 6a is OFF and the second switching element 7a is ON, and the current Ic flows through the current route shown in FIG. 8. That is, the smoothing capacitor 9 is bypassed, and the current Ic flowing from the AC power supply 1 via the rectification circuit 200 to the reactor 3 passes through the diode 5, the DC capacitor 8, the switching element 7a, and then the rectification circuit 200 in this order, to return to the AC power supply 1. At this time, the DC capacitor 8 is charged and the voltage Vc1 increases. In addition, since the voltage |Vac| is higher than the DC capacitor voltage Vc1, the current Ic increases due to the reactor 3.

Thus, also in the second control mode, by dividing each cycle of the drive cycles into four periods and combining three kinds of controls, the control circuit 10 performs ON/OFF control for the first switching element 6a and the second switching element 7a, to increase or decrease the current Ic and the DC capacitor voltage Vc1.

In the two kinds of controls in the first control mode and the second control mode shown in FIG. 15 and FIG. 16, increase/decrease adjustment of the current Ic and increase/decrease adjustment of the DC capacitor voltage Vc1 are performed by selecting one of the first phase αa and the second phase βa and adjusting the selected phase.

First, increase/decrease adjustment of the current Ic and increase/decrease adjustment of the DC capacitor voltage Vc1 in the first control mode will be described with reference to FIG. 15.

If the first phase αa is decreased to approach phase 0, the first period is shortened and the second period is prolonged. At this time, the second phase βa is not changed. For the current Ic, a decrease period is shortened and an increase period is prolonged. As a result, the current Ic increases. For the DC capacitor voltage Vc1, an increase period is shortened and a period during which the DC capacitor voltage Vc1 does not vary is prolonged. The average voltage (average DC capacitor voltage Vc1) of the DC capacitor voltage Vc1 in one cycle decreases.

If the second phase βa is decreased to approach phase (T/2), the third period is shortened and the fourth period is prolonged. At this time, the first phase αa is not changed. For the current Ic, a decrease period is shortened and an increase period is prolonged. As a result, the current Ic increases. For the DC capacitor voltage Vc1, a decrease period is shortened and a period during which the DC capacitor voltage Vc1 does not vary is prolonged. As a result, the average DC capacitor voltage Vc1 increases.

If the first phase αa is increased to approach phase (T/2), the first period is prolonged and the second period is shortened. At this time, the second phase βa is not changed. For the current Ic, a decrease period is prolonged and an increase period is shortened. As a result, the current Ic decreases. For the DC capacitor voltage Vc1, an increase period is prolonged and a period during which the DC capacitor voltage Vc1 does not vary is shortened. As a result, the average DC capacitor voltage Vc1 increases.

If the second phase βa is increased to approach phase T, the third period is prolonged and the fourth period is shortened. At this time, the first phase αa is not changed. For the current Ic, a decrease period is prolonged and an increase period is shortened. As a result, the current Ic decreases. For the DC capacitor voltage Vc1, a decrease period is prolonged and a period during which the DC capacitor voltage Vc1 does not vary is shortened. As a result, the average DC capacitor voltage Vc1 decreases.

That is, in the first control mode, in order to increase the current Ic, the first phase αa or the second phase βa is decreased, to increase a sum of the first ON period and the second ON period. In order to decrease the current Ic, the first phase αa or the second phase βa is increased, to decrease a sum of the first ON period and the second ON period.

Selection of the first phase αa or the second phase βa is performed based on the DC capacitor voltage Vc1.

In the case of increasing the current Ic, in order to increase the average DC capacitor voltage Vc1, the second phase βa is selected. In the case of decreasing the current Ic, in order to increase the average DC capacitor voltage Vc1, the first phase αa is selected. Thus, the ratio (first ON period/second ON period) of the first ON period and the second ON period is decreased, and the average DC capacitor voltage Vc1 is increased.

In the case of increasing the current Ic, in order to decrease the average DC capacitor voltage Vc1, the first phase αa is selected. In the case of decreasing the current Ic, in order to decrease the average DC capacitor voltage Vc1, the second phase βa is selected. Thus, the ratio (first ON period/second ON period) is increased, and the average DC capacitor voltage Vc1 is decreased.

Next, increase/decrease adjustment of the current Ic and increase/decrease adjustment of the DC capacitor voltage Vc1 in the second control mode will be described with reference to FIG. 16.

The first phase αa is increased to approach phase (T/2), while the second phase βa is not changed. As a result, the current Ic increases and the average DC capacitor voltage Vc1 decreases.

The second phase βa is increased to approach phase T, while the first phase αa is not changed. As a result, the current Ic increases and the average DC capacitor voltage Vc1 increases.

The first phase αa is decreased to approach phase 0, while the second phase βa is not changed. As a result, the current Ic decreases and the average DC capacitor voltage Vc1 increases.

The second phase βa is decreased to approach phase (T/2), while the first phase αa is not changed. As a result, the current Ic decreases and the average DC capacitor voltage Vc1 decreases.

That is, in the second control mode, in order to increase the current Ic, the first phase αa or the second phase βa is increased, to increase a sum of the first ON period and the second ON period. In order to decrease the current Ic, the first phase αa or the second phase βa is increased, to decrease a sum of the first ON period and the second ON period.

Selection of the first phase αa or the second phase βa is performed based on the DC capacitor voltage Vc1.

In the case of increasing the current Ic, in order to increase the average DC capacitor voltage Vc1, the second phase βa is selected. In the case of decreasing the current Ic, in order to increase the average DC capacitor voltage Vc1, the first phase αa is selected. Thus, the ratio (first ON period/second ON period) is decreased, and the average DC capacitor voltage Vc1 is increased.

In the case of increasing the current Ic, in order to decrease the average DC capacitor voltage Vc1, the first phase αa is selected. In the case of decreasing the current Ic, in order to decrease the average DC capacitor voltage Vc1, the second phase βa is selected. Thus, the ratio (first ON period/second ON period) is increased, and the average DC capacitor voltage Vc1 is decreased.

Hereinafter, generation of the gate signals G1a and G2a for the first switching element 6a and the second switching element 7a in order to perform the control operation as described above will be described.

In order to generate the gate signal G1a for the first switching element 6a, the control circuit 10 calculates a command (αa-duty command) for a duty cycle (αa/T) corresponding to the first phase αa by which the duty cycle of the first switching element 6a is determined. In addition, in order to generate the gate signal G2a for the second switching element 7a, the control circuit 10 calculates a command (βa-duty command) for a duty cycle (βa/T) corresponding to the second phase βa by which the duty cycle of the second switching element 7a is determined.

As base information for calculating the αa-duty command and the βa-duty command, a basic duty command ΔD is calculated. The basic duty command ΔD is calculated by the same calculation as shown in FIG. 10 in the above embodiment 1.

That is, the control circuit 10 generates the current command Ic* so as to maintain the smoothing capacitor voltage Vc1 at the target voltage Vc2* and so as to improve the input power factor from the AC power supply 1, thereby calculating the basic duty command ΔD for the first switching element 6a and the second switching element 7a.

The basic duty command ΔD corresponds to an adjustment amount for a selected one of the first phase αa and the second phase βa, and since each adjustment amount for the first phase α and the second phase β does not exceed the half cycle, the basic duty command ΔD is limited within a range of ±0.5. When ΔD is positive, the current Ic is controlled to be increased, and when ΔD is negative, the current Ic is controlled to be decreased.

Figure 17:
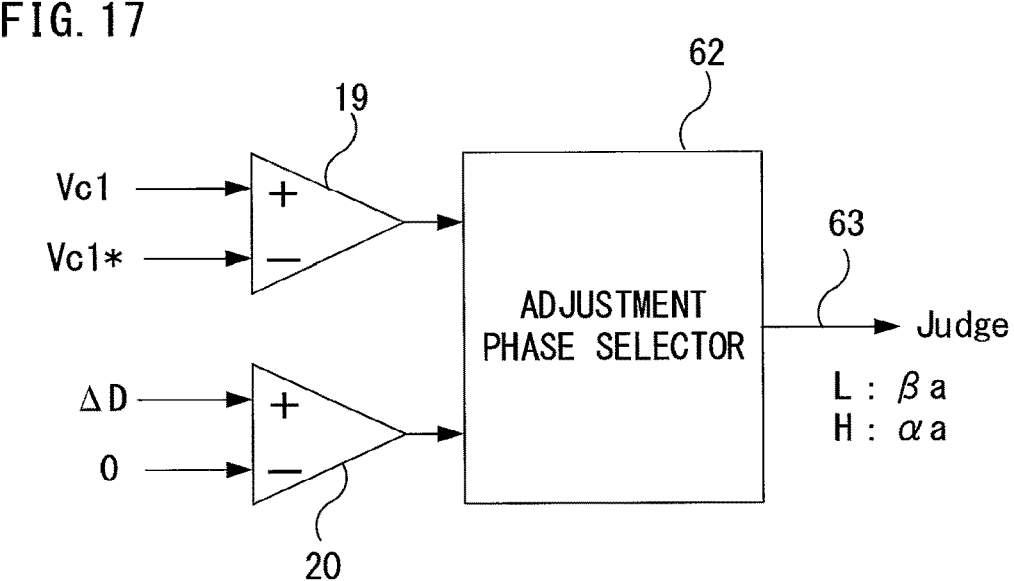
FIG. 17 is a control block diagram showing selection of an adjustment phase in control by the electric power conversion device according to embodiment 2 of the present invention.

FIG. 17 is a control block diagram showing selection of an adjustment phase (first phase αa/second phase βa) by the control circuit 10.

As shown in FIG. 17, the comparator 19 compares the DC capacitor voltage Vc1 and the command value Vc1* thereof, and the comparator 20 performs determination as to a sign of the basic duty command ΔD. Outputs of the comparators 19 and 20 are inputted to an adjustment phase selector 62. When both outputs of the comparators 19 and 20 indicate H level or indicate L level, output 63 (Judge signal) of the adjustment phase selector 62 indicates H level, and the first phase αa is selected. When outputs of the comparators 19 and 20 indicate a combination of H level and L level, the output 63 (Judge signal) of the adjustment phase selector 62 indicates L level, and the second phase βa is selected.

That is, in the case of Vc1≥Vc1*, if ΔD≥0, the first phase αa is selected, and if ΔD<0, the second phase βa is selected. In the case of Vc1<Vc1*, if ΔD≥0, the second phase βa is selected, and if ΔD<0, the first phase αa is selected.

Figure 18:
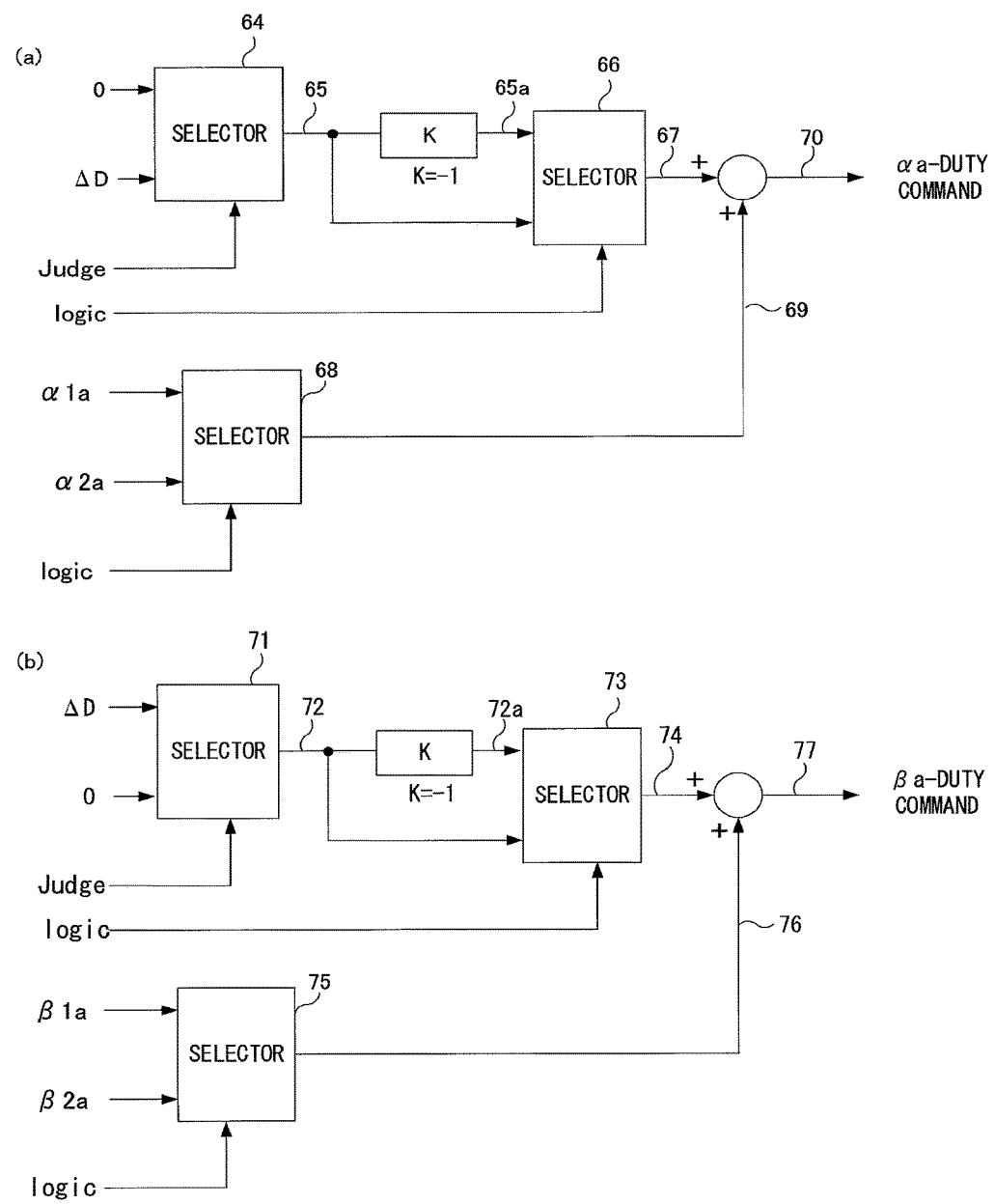
FIG. 18 is a control block diagram showing generation of a duty command for each switching element, according to embodiment 2 of the present invention.

FIG. 18 is a control block diagram showing calculation of the αa-duty command and the βa-duty command for determining the duty cycles of the first switching element 6a and the second switching element 7a. The αa-duty command and the βa-duty command are each calculated based on the Judge signal which is the output 63 of the adjustment phase selector 62, the logic signal indicating the control mode, and the calculated basic duty command ΔD.

The logic signal indicating the control mode is calculated by the same calculation as shown in FIG. 11(b) in the above embodiment 1. That is, if |Vac|<Vc1, the logic signal indicates L level and the first control mode is selected. If |Vac|≥Vc1, the logic signal indicates H level and the second control mode is selected.

FIG. 18(a) indicates a control block diagram showing calculation of the αa-duty command. In this case, an initial phase of the first phase αa is set so that an increase amount and a decrease amount of the current Ic in a half cycle from phase 0 to phase (T/2) of the drive cycle T become equal to each other. Feedforward control is performed using a duty cycle corresponding to the initial phase as initial values α1a and α2a of the αa-duty command. Here, α1a is an initial value in the first control mode, and α2a is an initial value in the second control mode.

As shown in FIG. 18(a), a selector 64 outputs a signal 65 indicating zero or the basic duty command ΔD, based on the Judge signal. When the Judge signal indicates L level and the second phase βa is selected, the signal 65 is zero. When the Judge signal indicates H level and the first phase αa is selected, the signal 65 is the basic duty command ΔD.

Next, the polarity of the signal 65 is inverted to generate a reverse polarity signal 65a, and a selector 66 outputs one of the signal 65 and the reverse polarity signal 65a, based on the logic signal. When the logic signal indicates L level and the first control mode is selected, output 67 of the selector 66 is the reverse polarity signal 65a. When the logic signal indicates H level and the second control mode is selected, output 67 of the selector 66 is the signal 65.

Meanwhile, a selector 68 outputs one of the initial values α1a and α2a, based on the logic signal. When the logic signal indicates L level (the first control mode is selected), output 69 of the selector 68 is the initial value α1a. When the logic signal indicates H level (the second control mode is selected), output 69 of the selector 68 is the initial value α2a. The output 69 is added as a feedforward term to the output 67 of the selector 66, whereby an αa-duty command 70 is generated.

FIG. 18(b) is a control block diagram showing calculation of the βa-duty command. In this case, an initial phase of the second phase βa is set so that an increase amount and a decrease amount of the current Ic in a half cycle from phase (T/2) to phase T of the drive cycle T become equal to each other. Feedforward control is performed using a duty cycle corresponding to the initial phase as initial values β1a and β2a of the βa-duty command. Here, β1a is an initial value in the first control mode, and β2a is an initial value in the second control mode.

As shown in FIG. 18(b), a selector 71 outputs a signal 72 indicating the basic duty command ΔD or zero, based on the Judge signal. When the Judge signal indicates L level and the second phase βa is selected, the signal 72 is the basic duty command ΔD. When the Judge signal indicates H level and the first phase αa is selected, the signal 72 is zero.

Next, the polarity of the signal 72 is inverted to generate a reverse polarity signal 72a, and a selector 73 outputs one of the signal 72 and the reverse polarity signal 72a, based on the logic signal. When the logic signal indicates L level and the first control mode is selected, output 74 of the selector 73 is the reverse polarity signal 72a. When the logic signal indicates H level and the second control mode is selected, output 74 of the selector 73 is the signal 72.

Meanwhile, a selector 75 outputs one of the initial values β1a and β2a, based on the logic signal. When the logic signal indicates L level (the first control mode is selected), output 76 of the selector 75 is the initial value β1a. When the logic signal indicates H level (the second control mode is selected), output 76 of the selector 75 is the initial value β1a. The output 76 is added as a feedforward term to the output 74 of the selector 73, whereby a βa-duty command 77 is generated.

Thus, the αa-duty command 70 and the βa-duty command 77 are calculated.

In the first control mode, when the first phase αa is selected as the adjustment phase, the αa-duty command 70 is generated by adding a polarity inverted value of the basic duty command ΔD to the initial value α1a, and the βa-duty command 77 becomes the initial value β1a. In the first control mode, when the second phase βa is selected as the adjustment phase, the αa-duty command 70 becomes the initial value α1a, and the βa-duty command 77 is generated by adding a polarity inverted value of the basic duty command ΔD to the initial value β1a.

In the second control mode, when the first phase αa is selected as the adjustment phase, the αa-duty command 70 is generated by adding the basic duty command ΔD to the initial value α2a, and the βa-duty command 77 becomes the initial value β2a. In the second control mode, when the second phase βa is selected as the adjustment phase, the αa-duty command 70 becomes the initial value α2a, and the βa-duty command 77 is generated by adding the basic duty command ΔD to the initial value β2a.

Next, the initial values α1a and α2a and the initial values β1a and β2a used in the feedforward control shown in FIG. 18 will be described.

The initial values α1a and α2a for determining the first phase αa at which the first switching element 6a is turned on or off are set so that an increase amount and a decrease amount of the current Ic in a half cycle from phase 0 to phase (T/2) of the drive cycle T become equal to each other, as described above.

First, the first control mode in the case where the voltage |Vac| is lower than the DC capacitor voltage Vc1 will be described.

In a half cycle from phase 0 to phase (T/2), an increase period of the current Ic is the second period (from first phase αa to phase (T/2)). Therefore, a current increase amount Iup in the half cycle is represented by the following Expression (17), where L is a reactor capacity of the reactor 3.

$$Iup = (|Vac|/L) \cdot ((T/2) - \alpha a) \qquad \text{Expression (17)}$$

In a half cycle from phase 0 to phase (T/2), a decrease period of the current Ic is the first period (from phase 0 to first phase αa). Therefore, a current decrease amount Idown in the half cycle is represented by the following Expression (18).

$$Idown = ((Vc1 - |Vac|)/L) \cdot \alpha a \qquad \text{Expression (18)}$$

When the current increase amount Iup and the current decrease amount Idown are equal to each other, the following Expression (19) is satisfied.

$$Iup = Idown \qquad \text{Expression (19)}$$

The value of (αa/T) in this case is the initial value α1a. From Expressions (17) to (19), the following Expression (20) is obtained.

$$\alpha 1a = (\alpha a/T) = |Vac|/2Vc1 \qquad \text{Expression (20)}$$

Next, the second control mode in the case where the voltage |Vac| is equal to or higher than the DC capacitor voltage Vc1 will be described.

In a half cycle from phase 0 to phase (T/2), an increase period of the current Ic is the first period (from phase 0 to first phase αa). Therefore, a current increase amount Iup in the half cycle is represented by the following Expression (21).

$$Iup = (|Vac| + Vc1 - Vc2)/L) \cdot \alpha a \qquad \text{Expression (21)}$$

In a half cycle from phase 0 to phase (T/2), a decrease period of the current Ic is the second period (from first phase αa to phase (T/2)). Therefore, a current decrease amount Idown in the half cycle is represented by the following Expression (22).

$$Idown = ((Vc2 - |Vac|)/L) \cdot ((T/2) - \alpha a) \qquad \text{Expression (22)}$$

When the current increase amount Iup and the current decrease amount Idown are equal to each other, the following Expression (23) is satisfied.

$$Iup = Idown \qquad \text{Expression (23)}$$

The value of (αa/T) in this case is the initial value α2a. From Expressions (21) to (23), the following Expression (24) is obtained.

$$\alpha 2a = (\alpha a/T) = (Vc2 - |Vac|)/2Vc1 \qquad \text{Expression (24)}$$

The initial values β1a and β2a for determining the second phase βa at which the second switching element 7a is turned on or off are set so that an increase amount and a decrease amount of the current Ic in a half cycle from phase (T/2) to phase T of the drive cycle T become equal to each other, as described above.

First, the first control mode in the case where the voltage |Vac| is lower than the DC capacitor voltage Vc1 will be described.

In a half cycle from phase (T/2) to phase T, an increase period of the current Ic is the fourth period (from second phase βa to phase T). Therefore, a current increase amount Iup in the half cycle is represented by the following Expression (25), where L is a reactor capacity of the reactor 3.

$$Iup = (|Vac|/L) \cdot (T - \beta a) \qquad \text{Expression (25)}$$

In a half cycle from phase (T/2) to phase T, a decrease period of the current Ic is the third period (from phase (T/2) to second phase βa). Therefore, a current decrease amount Idown in the half cycle is represented by the following Expression (26).

$$Idown = (Vc2 - |Vac| - Vc1)/L) \cdot (\beta a - (T/2)) \qquad \text{Expression (26)}$$

When the current increase amount Iup and the current decrease amount Idown are equal to each other, the following Expression (27) is satisfied.

$$Iup = Idown \qquad \text{Expression (27)}$$

The value of (β/T) in this case is the initial value β1a. From Expressions (25) to (27), the following Expression (28) is obtained.

$$\beta1a=(\beta/T)=(|Vac|-Vc1+Vc2)/2(Vc2-Vc1) \quad \text{Expression (28)}$$

Next, the second control mode in the case where the voltage |Vac| is equal to or higher than the DC capacitor voltage Vc1 will be described.

In a half cycle from phase (T/2) to phase T, an increase period of the current Ic is the third period (from phase (T/2) to second phase βa). Therefore, a current increase amount Iup in the half cycle is represented by the following Expression (29).

$$Iup=((|Vac|-Vc1)/L)\cdot(\beta a-(T/2)) \quad \text{Expression (29)}$$

In a half cycle from phase (T/2) to phase T, a decrease period of the current Ic is the fourth period (from second phase βa to phase T). Therefore, a current decrease amount Idown in the half cycle is represented by the following Expression (30).

$$Idown=((Vc2-|Vac|)/L)\cdot(T-\beta a) \quad \text{Expression (30)}$$

When the current increase amount Iup and the current decrease amount Idown are equal to each other, the following Expression (31) is satisfied.

$$Iup=Idown \quad \text{Expression (31)}$$

The value of (βa/T) in this case is the initial value β2a. From Expressions (29) to (31), the following Expression (32) is obtained.

$$\beta2a=(\beta a/T)=(2Vc2-|Vac|+Vc1)/2(Vc2-Vc1) \quad \text{Expression (32)}$$

Figure 19:
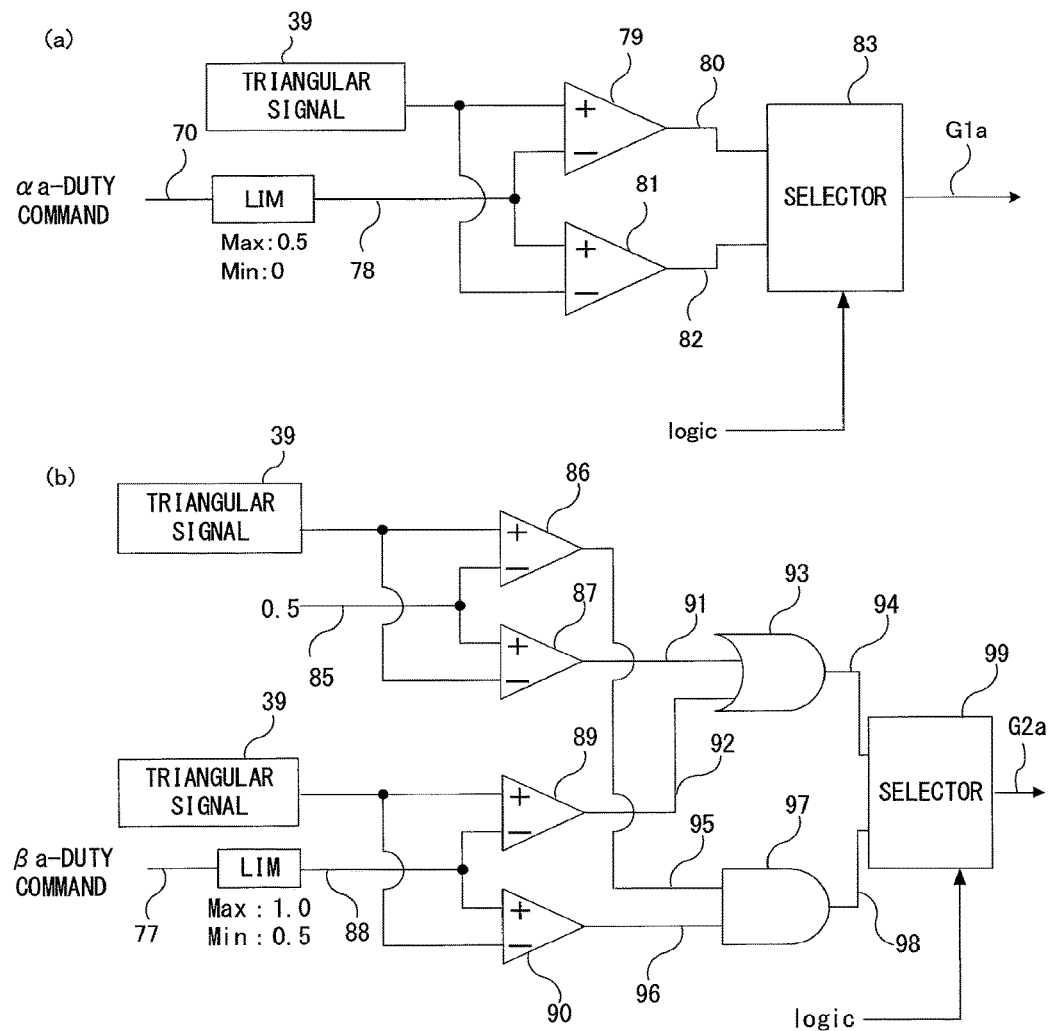
FIG. 19 is a control block diagram showing generation of a gate signal for each switching element, according to embodiment 2 of the present invention.

FIG. 19 is a control block diagram showing generation of the gate signals G1a and G2a for the first switching element 6a and the second switching element 7a based on the αa-duty command 70 and the βa-duty command 77.

FIG. 19(a) is a control block diagram showing generation of the gate signal G1a for the first switching element 6a. First, a value 78 obtained by limiting the calculated αa-duty command 70 within a range of 0 to 0.5 by a limiter is inputted to a negative terminal of a comparator 79 and a positive terminal of a comparator 81. In addition, the same triangular wave signal 39 as shown in FIG. 14 in the above embodiment 1 is inputted to a positive terminal of the comparator 79 and a negative terminal of the comparator 81.

Output signals 80 and 82 from the comparators 79 and 81 are inputted to a selector 83. Then, based on the logic signal, one of the output signals 80 and 82 is outputted as the gate signal G1a from the selector 83. When the logic signal indicates L level and the first control mode is selected, the gate signal G1a is the output signal 80 and, indicates H level during a period from first phase αa to phase T. When the logic signal indicates H level and the second control mode is selected, the gate signal G1a is the output signal 82 and indicates H level during a period from phase 0 to first phase αa.

FIG. 19(b) is a control block diagram showing generation of the gate signal G2a for the second switching element 7a.

A duty command signal 85 indicating 0.5 is inputted to a negative terminal of a comparator 86 and a positive terminal of a comparator 87. In addition, the triangular wave signal 39 is inputted to a positive terminal of the comparator 86 and a negative terminal of the comparator 87.

Meanwhile, a value 88 obtained by limiting the calculated βa-duty command 77 within a range of 0.5 to 1.0 by a limiter is inputted to a negative terminal of a comparator 89 and a positive terminal of a comparator 90. In addition, the triangular wave signal 39 is inputted to a positive terminal of the comparator 89 and a negative terminal of the comparator 90.

Output 91 of the comparator 87 and output 92 of the comparator 89 are inputted to an OR operation element 93.

Output 95 of the comparator 86 and output 96 of the comparator 90 are inputted to an AND operation element 97.

An output signal 94 from the OR operation element 93 and an output signal 98 from the AND operation element 97 are inputted to a selector 99, and based on the logic signal, one of the output signals 94 and 98 is outputted therefrom as the gate signal G2a. When the logic signal indicates L level and the first control mode is selected, the gate signal G2a is the output signal 94 and indicates H level during a period from second phase βa to phase (T/2). When the logic signal indicates H level and the second control mode is selected, the gate signal G2a is the output signal 98 and indicates H level during a period from phase (T/2) to second phase βa.

The control circuit 10 thus generates the gate signals G1a and G2a, to control the first switching element 6a and the second switching element 7a.

Next, switching between the first control mode and the second control mode will be described. The switching of the control mode is performed at an AC power supply phase where the voltage |Vac| is equal to the DC capacitor voltage Vc1, using the logic signal. At this time, an ON/OFF state of each of the first switching element 6a and the second switching element 7a is to be inverted.

At the time of switching of the control mode, |Vac|=Vc1 is satisfied.

Therefore, from Expressions (20) and (24), the initial values α1a and α2a of the αa-duty command are as follows.

$$\alpha 1a=\alpha 2a=\tfrac{1}{2}$$

In addition, from Expressions (28) and (32), the initial values β1 and β2 of the βa-duty command are as follows.

$$\beta 1a=\beta 2a=1$$

Here, the DC capacitor voltage Vc1 is assumed to be half the smoothing capacitor voltage Vc2.

Thus, when the control is switched between the first control mode and the second control mode based on change in the AC power supply voltage Vac, either the initial value α1a (=α2a) of the αa-duty command or the initial value β1a (=β2a) of the βa-duty command does not change. Therefore, the control mode can be switched by simply inverting the ON/OFF state of each of the first switching element 6a and the second switching element 7a. Thus, the control calculation can be switched easily and fast.

In the present embodiment, the switching phases of the first switching element 6a and the second switching element 7a are symmetric with those shown in the above embodiment 1 about an axis at phase (T/2) of the drive cycle T. In this case, the duty cycle of the first switching element 6a is determined based on the αa-duty command, and the duty cycle of the second switching element 7a is determined based on the βa-duty command, but the control calculation method therefor is the same as in the above embodiment 1.

That is, using the current command Ic*, the control circuit 10 adjusts the αa-duty command and the βa-duty command corresponding to the duty cycles of the first switching element 6a and the second switching element 7a, thereby controlling the switching section 100 so as to control the DC voltage Vc2 of the smoothing capacitor 9 to be the target voltage Vc2* and so as to improve the input power factor from the AC power supply 1. In addition, the control circuit 10 generates and adjusts the αa-duty command and the βa-duty command individually, thereby controlling a sum and a ratio of the first ON period of the first switching element 6a and the second ON period of the second switching element 7a in one cycle.

Thus, while the current control is performed so as to improve the input power factor from the AC power supply 1, charge and discharge of the DC capacitor 8 can be controlled so as to cause the voltage Vc1 to follow the command value Vc1*, and in addition, the same effect as in the above embodiment 1 is provided.

Embodiment 3

Next, embodiment 3 of the present invention will be described.

Figure 20:
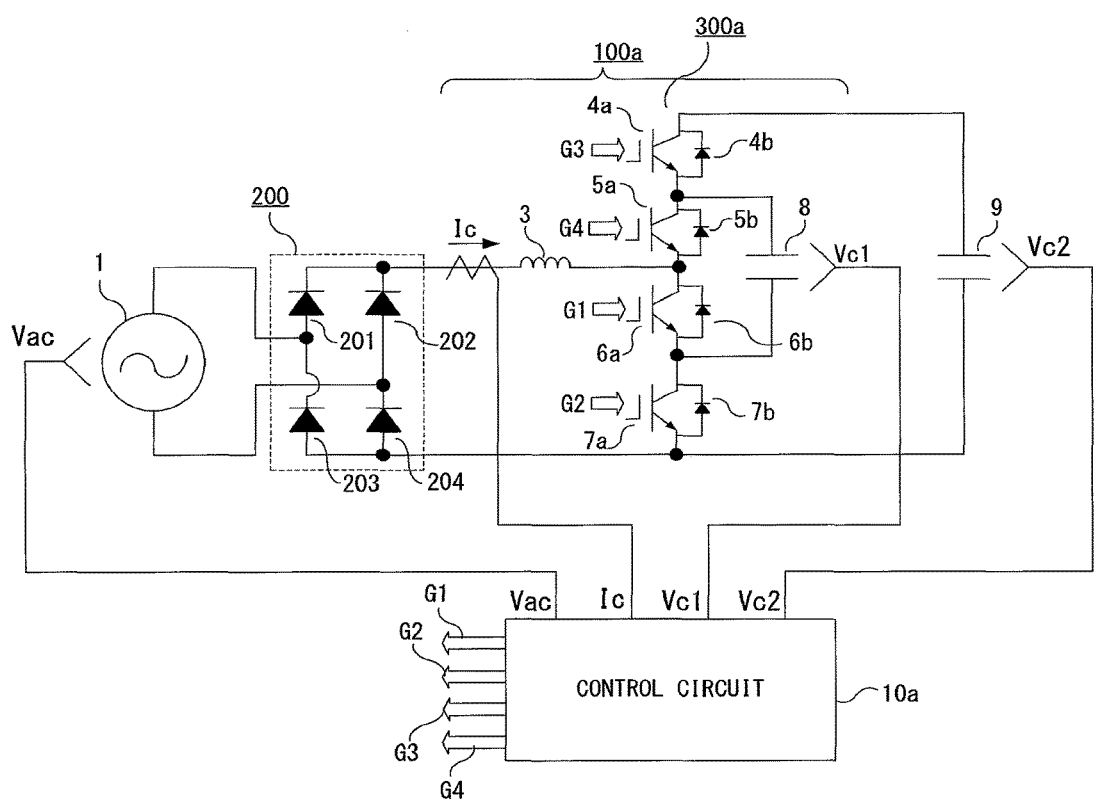
FIG. 20 is a configuration diagram of an electric power conversion device according to embodiment 3 of the present invention.

FIG. 20 is a schematic configuration diagram of an electric power conversion device according to embodiment 3 of the present invention. As shown in FIG. 20, the electric power conversion device includes a main circuit and a control circuit 10a. As in the above embodiment 1, the main circuit includes: the rectification circuit 200 for rectifying input from the AC power supply 1; a switching section 100a for stepping up voltage of output of the rectification circuit 200, to perform a resultant output; and the smoothing capacitor 9 for smoothing output of the switching section 100a.

In the present embodiment 3, a first semiconductor element and a second semiconductor element composing a leg part 300a in the switching section 100a are switching elements. That is, a switching element 4a as the first semiconductor element, a switching element 5a as the second semiconductor element, the first switching element 6a, and the second switching element 7a are connected in series between the positive and negative terminals of the smoothing capacitor 9, thus forming the leg part 300a.

In this case, the switching elements 4a and 5a are each composed of an IGBT to which a diode 4b, 5c is connected in antiparallel, respectively. Instead of an IGBT, semiconductor switching elements such as a MOSFET with a diode contained between a source and a drain thereof may be used.

The other configuration of the main circuit is the same as in the electric power conversion device according to the above embodiment 1 shown in FIG. 1.

Based on the detected DC capacitor voltage Vc1, the detected smoothing capacitor voltage Vc2, the detected AC power supply voltage Vac, and the detected current Ic, the control circuit 10a generates gate signals G1, G2, G3, and G4 so that the smoothing capacitor voltage Vc2 becomes the target voltage Vc2* which is set constant voltage, thereby performing ON/OFF control for the first switching element 6a, the second switching element 7a, the switching element 4a, and the switching element 5a, and thus performing output control for the switching section 100a.

As in the above embodiment 1, the control circuit 10a has different control modes respectively corresponding to the case where the voltage |Vac| is lower than the DC capacitor voltage Vc1 and the case where the voltage |Vac| is equal to or higher than the DC capacitor voltage Vc1. The control circuit 10a performs control in a first control mode for the former case, and performs control in a second control mode for the latter case.

Figure 21:
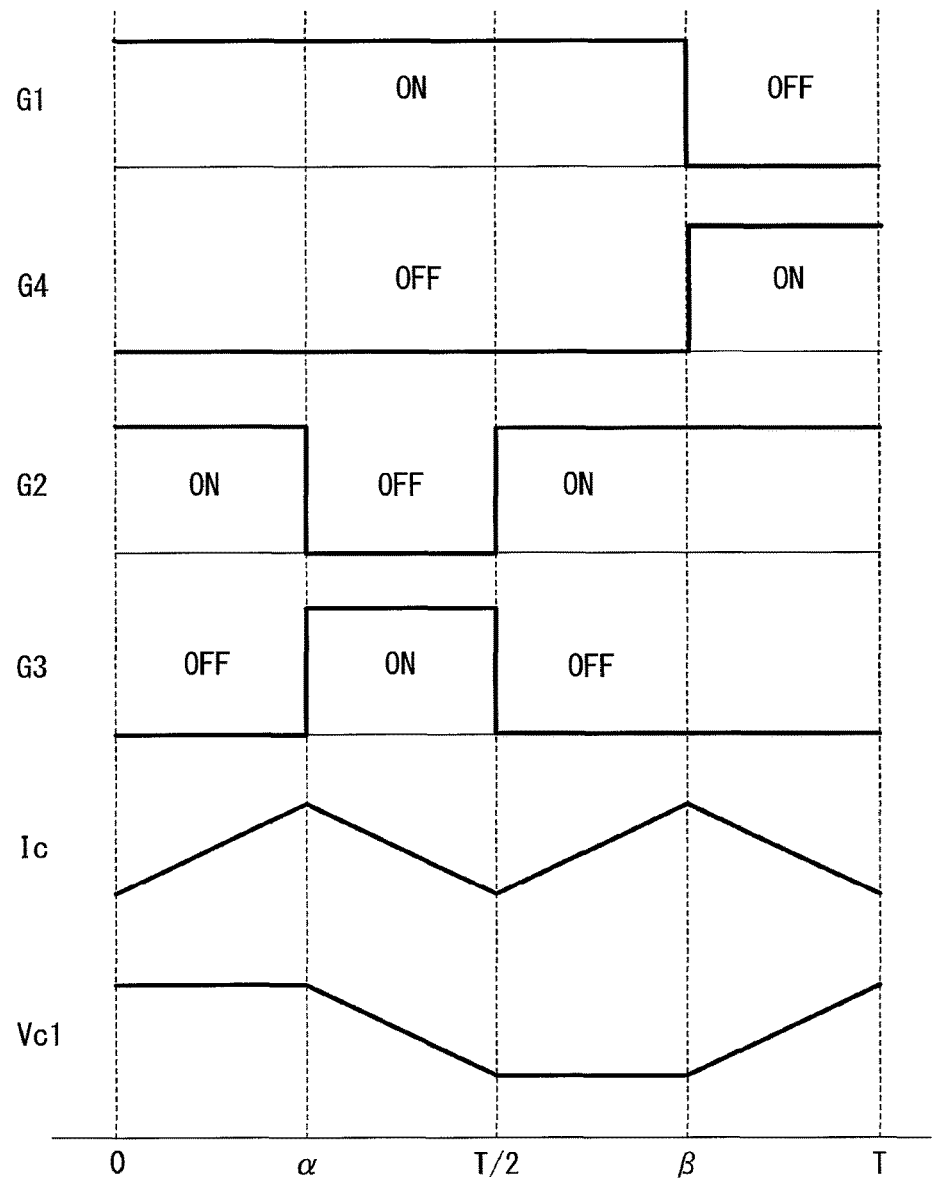
FIG. 21 is a waveform diagram of gate signals and each part in a first control mode of the electric power conversion device according to embodiment 3 of the present invention.
Figure 22:
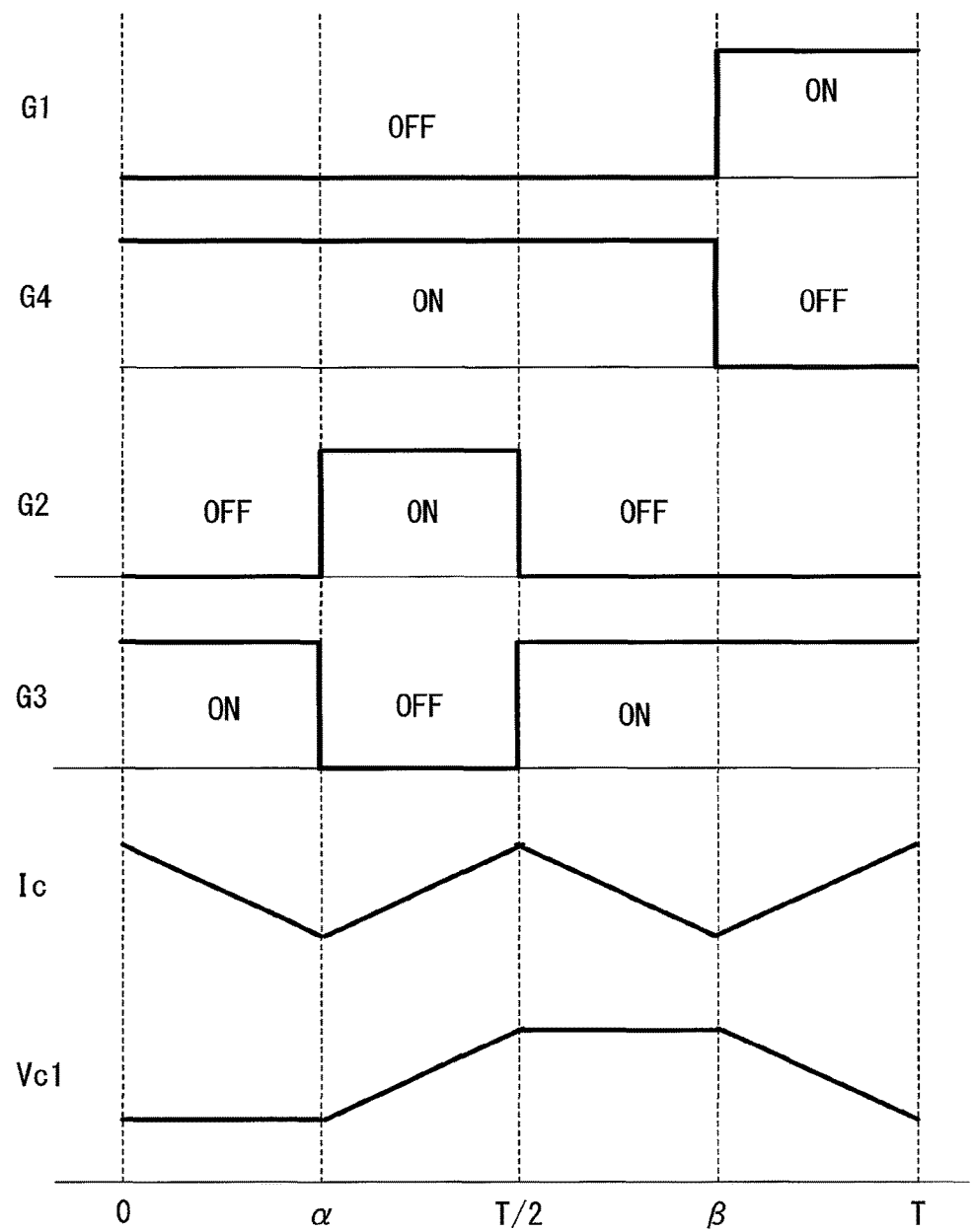
FIG. 22 is a waveform diagram of gate signals and each part in a second control mode of the electric power conversion device according to embodiment 3 of the present invention.

FIG. 21 is a diagram showing waveforms of the gate signals G1 to G4, the current Ic, and the DC capacitor voltage Vc1 in the first control mode. FIG. 22 is a diagram showing waveforms of the gate signals G1 to G4, the current Ic, and the DC capacitor voltage Vc1 in the second control mode.

As shown in FIG. 21 and FIG. 22, the gate signals G1 and G2 for the first switching element 6a and the second switching element 7a are the same as those in the above embodiment 1. The gate signal G3 for the switching element 4a is obtained by inverting ON and OFF of the gate signal G2 for the second switching element 7a, and the gate signal G4 for the switching element 5a is obtained by inverting ON and OFF of the gate signal G1 for the first switching element 6a.

Therefore, the switching elements 4a and 5a conduct currents in the period during which the diodes 4b and 5b conduct currents, and thus perform current conducting and blocking operations in the same manner as in the diodes 4 and 5 in the above embodiment 1. Thus, current flows in the same manner as in the above embodiment 1 and the switching section 100a operates accordingly, and waveforms of the current Ic and the DC capacitor voltage Vc1 are also the same as in the above embodiment 1.

As in the above embodiment 1, the control circuit 10a generates the gate signals G1 and G2 for the first switching element 6a and the second switching element 7a, and generates the gate signals G4 and G3 obtained by inverting ON and OFF of the gate signals G1 and G2. Thus, the electric power conversion device operates in the same manner as in the above embodiment 1, thereby providing the same effect. In addition, since the switching element 4a and the switching element 5a are used as the first semiconductor element and the second semiconductor element, as compared to the case of using diodes, conduction loss can be reduced and power conversion efficiency is improved.

Figure 23:
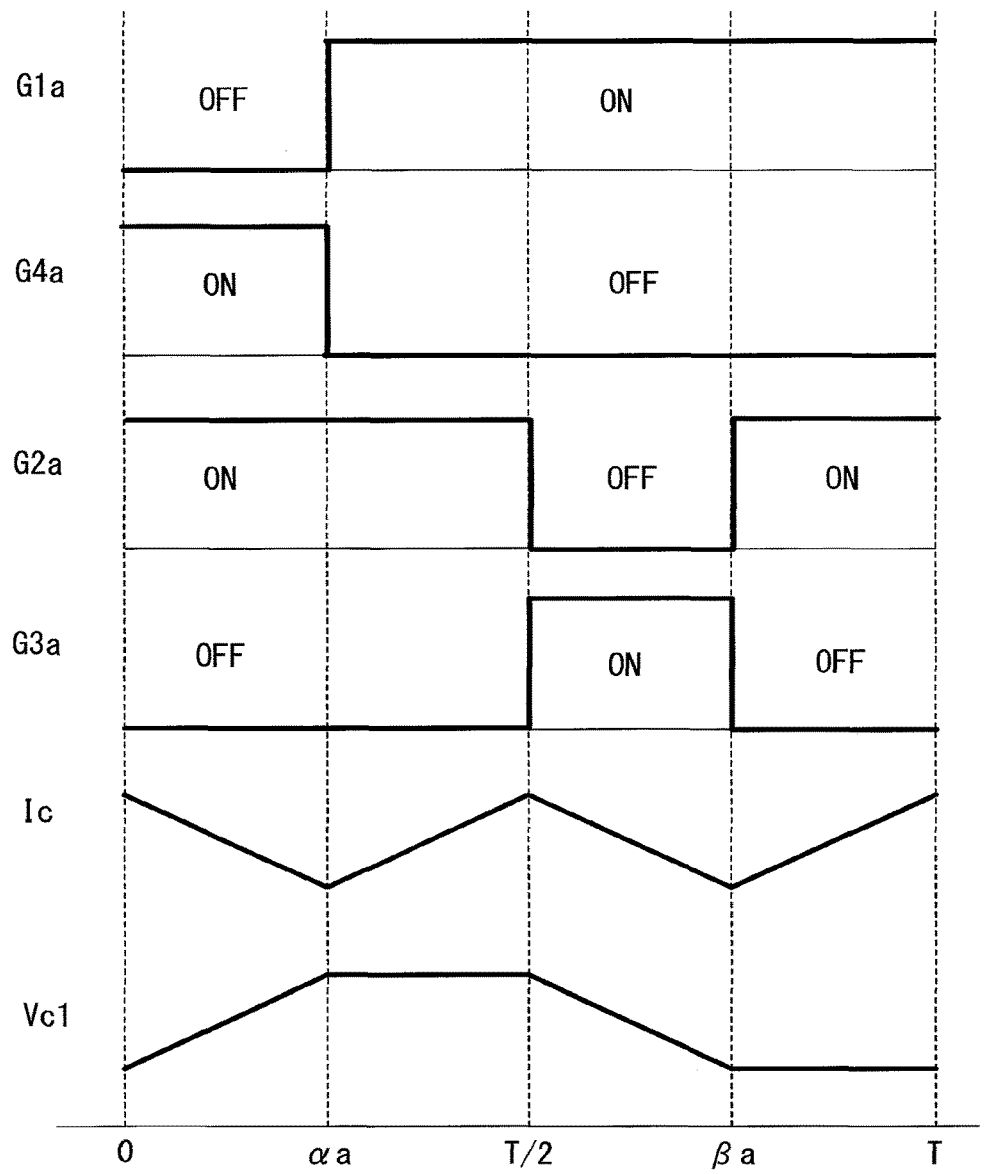
FIG. 23 is a waveform diagram of gate signals and each part in a first control mode of an electric power conversion device according to another example of embodiment 3 of the present invention.
Figure 24:
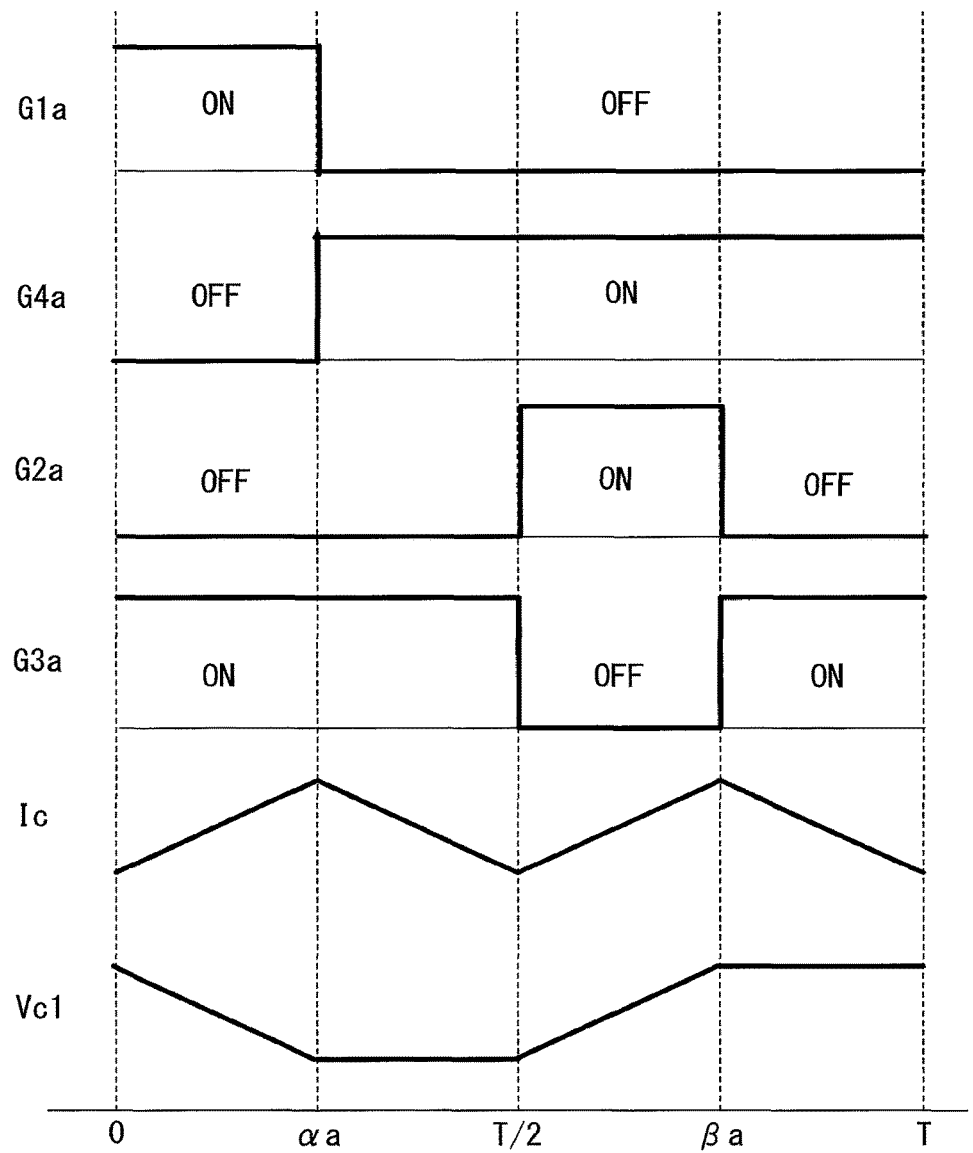
FIG. 24 is a waveform diagram of gate signals and each part in a second control mode of the electric power conversion device according to the other example of embodiment 3 of the present invention.

The gate signals G1a and G2a as in the above embodiment 2 may be used. FIG. 23 and FIG. 24 show this case. FIG. 23 is a diagram showing waveforms of gate signals G1a to G4a, the current Ic, and the DC capacitor voltage Vc1 in the first control mode. FIG. 22 is a diagram showing waveforms of the gate signals G1a to G4a, the current Ic, and the DC capacitor voltage Vc1 in the second control mode. In this case, as in the above embodiment 2, the control circuit 10a generates the gate signals G1a and G2a for the first switching element 6a and the second switching element 7a, and generates the gate signals G4 and G3 for the switching element 5a and the switching element 4a by inverting ON and OFF of the gate signals G1a and G2a. Thus, the electric power conversion device operates in the same manner as in the above embodiment 2, thereby providing the same effect.

Embodiment 4

Next, embodiment 4 of the present invention will be described.

Hereinafter, the present embodiment 4 will be described focusing on a part different from the above embodiments 1 and 2, with reference to the drawings. The same components as those in the above embodiments 1 and 2 are denoted by the same reference characters, and the description thereof is omitted.

Figure 25:
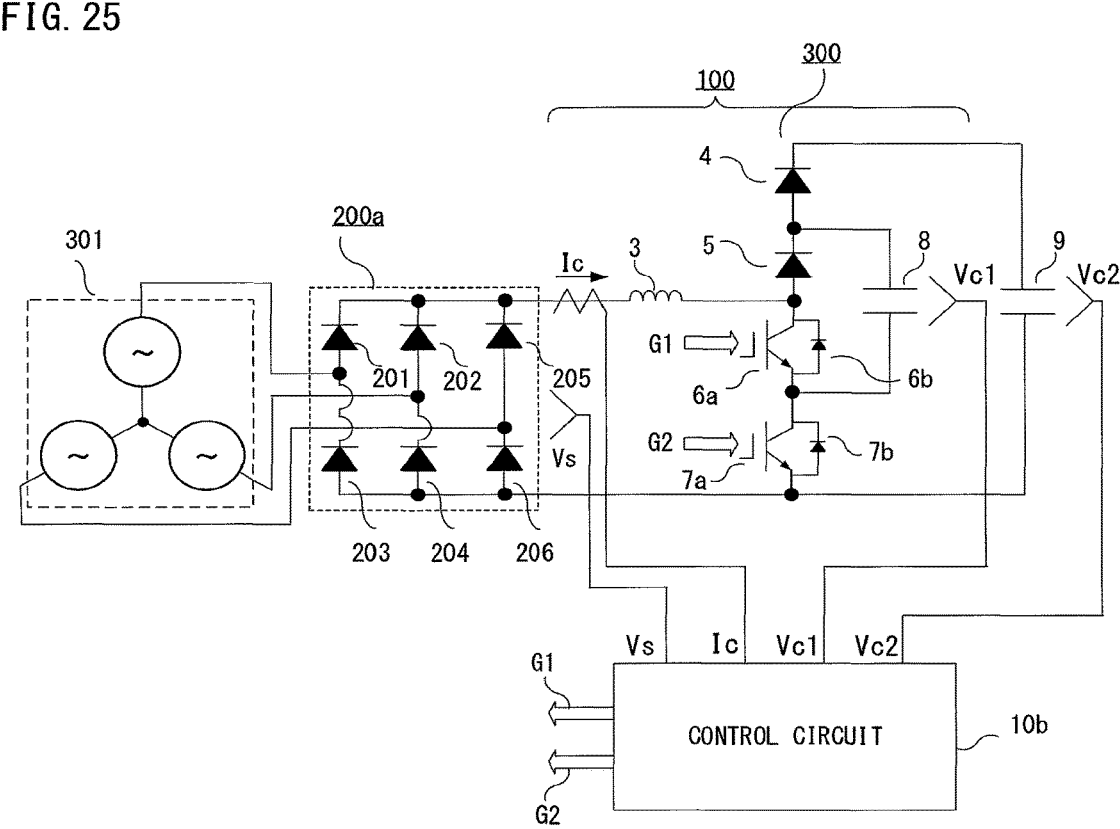
FIG. 25 is a configuration diagram of an electric power conversion device according to embodiment 4 of the present invention.

FIG. 25 is a schematic configuration diagram of an electric power conversion device according to the present embodiment 4.

As shown in FIG. 25, the electric power conversion device receives AC power from a three-phase AC power supply 301 configured in star connection. A rectification circuit 200a is composed of six diodes 201 to 206 connected in a three-phase bridge form, for performing rectification for all the phases of the AC power supply 301. In this case, a voltage sensor is provided at a position for detecting voltage Vs after rectification of input from the AC power supply 301 by the rectification circuit 200a.

Based on the detected DC capacitor voltage Vc1, the detected smoothing capacitor voltage Vc2, the detected voltage Vs, and the detected current Ic, a control circuit 10b generates gate signals G1 and G2 so that the smoothing capacitor voltage Vc2 becomes the target voltage Vc2* which is set constant voltage, thereby performing ON/OFF control for the first switching element 6a and the second switching element 7a, and thus performing output control for the switching section 100.

Figure 26:
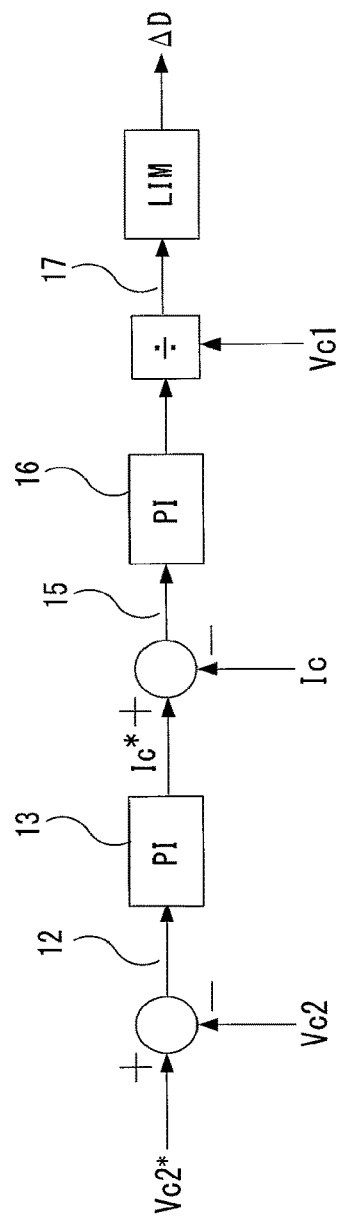
FIG. 26 is a control block diagram showing basic control in the electric power conversion device according to embodiment 4 of the present invention.

FIG. 26 is a control block diagram of the control circuit 10b.

In this case, the current Ic is DC current obtained by synthesizing currents obtained through rectification for the phases of the AC power supply 301. Therefore, the AC power supply synchronized frequency Fs shown in FIG. 10 in embodiment 1 is omitted. Also in this case, it is possible to perform control by generating the current command Ic* so as to improve the input power factor.

In embodiment 1 and embodiment 2, selection of the control mode is performed using the voltage Vac of the AC power supply. In the present embodiment, selection of the control mode is performed using the voltage Vs after rectification.

Also in the present embodiment, based on the detected DC capacitor voltage Vc1, the detected smoothing capacitor voltage Vc2, the detected voltage Vs after rectification, and the detected current Ic, the control circuit 10b performs output control for the switching section 100 by turning on and off the first switching element 6a and the second switching element 7a through high-frequency PWM control so as to control the current Ic so that an input power factor from the AC power supply 301 becomes almost 1, and so as to control voltage of the smoothing capacitor 9 to be the target voltage Vc2*. In addition, the control circuit 10b adjusts a charge/discharge amount of the DC capacitor 8 to control the DC capacitor voltage Vc1 to be a constant command value Vc1*.

The smoothing capacitor voltage Vc2 is higher than the voltage Vs, and the command value Vc1* for the DC capacitor voltage Vc1 is set to half the target voltage Vc2* for the smoothing capacitor 9.

Thus, also in the case of using, as the AC power supply, the three-phase AC power supply 301 configured in star connection, while the current control is performed so as to improve the input power factor from the AC power supply 301, charge and discharge of the DC capacitor 8 can be controlled so as to cause the voltage Vc1 to follow the command value Vc1*, and the same effect as in the above embodiments 1 and 2 is provided.

Embodiment 5

Next, embodiment 5 of the present invention will be described.

Hereinafter, the present embodiment 5 will be described focusing on a part different from the above embodiment 4, with reference to the drawings. The same components as those in the above embodiment 4 are denoted by the same reference characters, and the description thereof is omitted.

Figure 27:
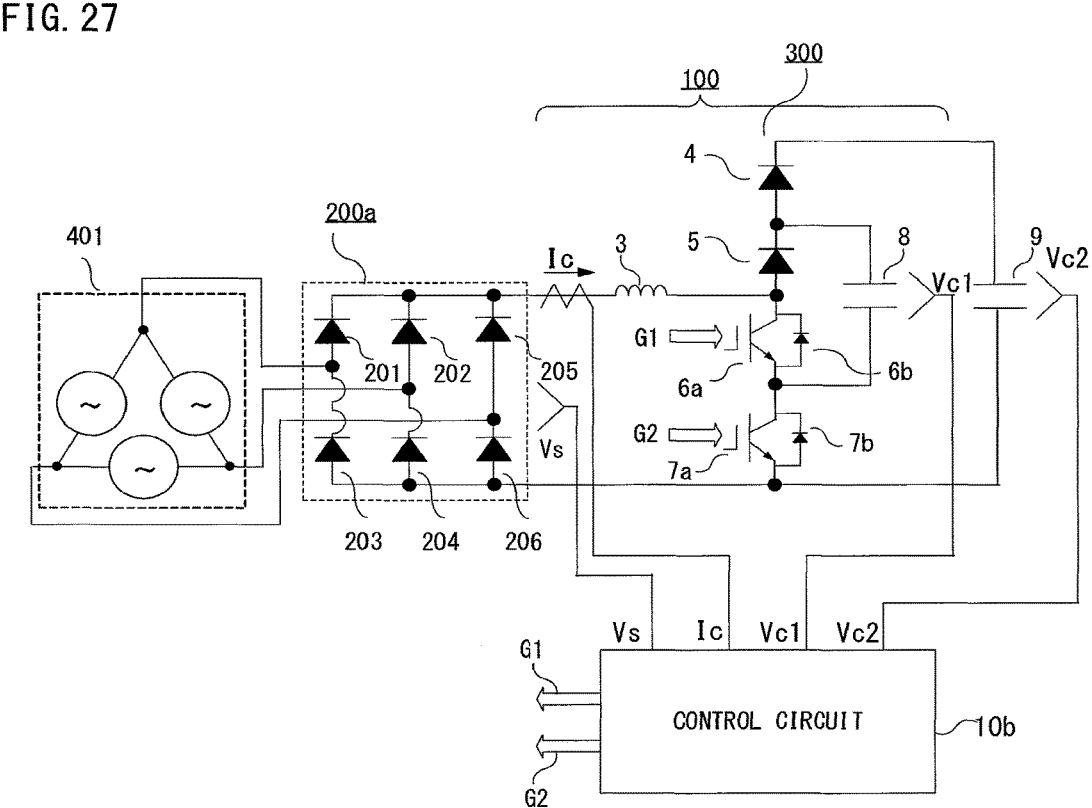
FIG. 27 is a configuration diagram of an electric power conversion device according to embodiment 5 of the present invention.

FIG. 27 is a schematic configuration diagram of an electric power conversion device according to the present embodiment 5.

As shown in FIG. 27, the electric power conversion device receives AC power from a three-phase AC power supply 401 configured in delta connection.

Also in the present embodiment, as in embodiment 4, input from the AC power supply 401 is rectified by the rectification circuit 200a, and then, based on: the detected DC capacitor voltage Vc1; the detected smoothing capacitor voltage Vc2; the detected voltage Vs obtained by rectifying input of the AC power supply 401; and the detected current Ic which is DC current obtained by synthesizing currents obtained through rectification for the phases, the control circuit 10b performs output control for the switching section 100 by turning on and off the first switching element 6a and the second switching element 7a through high-frequency PWM control so as to control the current Ic so that an input power factor from the AC power supply 401 becomes almost 1, and so as to control voltage of the smoothing capacitor 9 to be the target voltage Vc2*. In addition, the control circuit 10b adjusts a charge/discharge amount of the DC capacitor 8 to control the DC capacitor voltage Vc1 to be a constant command value Vc1*.

The smoothing capacitor voltage Vc2 is higher than the voltage Vs, and the command value Vc1* for the DC capacitor voltage Vc1 is set to half the target voltage Vc2* for the smoothing capacitor 9.

Thus, also in the case of using, as the AC power supply, the three-phase AC power supply 401 configured in delta connection, while the current control is performed so as to improve the input power factor from the AC power supply 401, charge and discharge of the DC capacitor 8 can be controlled so as to cause the voltage Vc1 to follow the command value Vc1*, and the same effect as in the above embodiment 4 is provided.

It is noted that, within the scope of the present invention, the above embodiments may be freely combined with each other, or each of the above embodiments may be modified or abbreviated as appropriate.

The invention claimed is:

1. An electric power conversion device comprising:
a rectification circuit for rectifying input from an AC porter supply;
a switching section for stepping up voltage of output of the rectification circuit, to perform a resultant output;
a smoothing capacitor for smoothing the output of the switching section;
a current sensor that detects circuit current flowing from the AC power supply via the rectification circuit; and
a control circuit for controlling the switching section, wherein
the switching section includes:
a reactor having a first end connected to a positive side terminal of the rectification;
a leg part formed by a first semiconductor element, a second semiconductor element, a first switching element, and a second switching element for each controlling conduction and block of current, which are connected in series between positive and negative terminals of the smoothing capacitor, a second end of the reactor being connected to a connection point between the second semiconductor element and the first switching element; and
a DC capacitor connected between a connection point between the first semiconductor element and the second semiconductor element, and a connection point between the first switching element and the second switching element,
the control circuit performs PWM control for the switching section, thereby controlling voltage of the DC capacitor, controlling circuit current flowing from the AC power supply via the rectification circuit, and controlling an input power factor from the AC power supply,
the control circuit includes a β-duty command calculation circuit for calculating a duty command for the first switching element in one cycle based on the circuit current detected by the current sensor, and α-duty command calculation circuit for calculating a duty command for the second switching element in one cycle based on the circuit current detected by the current sensor, the control circuit performs driving of the first switching element and the second switching element using the same drive cycle, with reference phases thereof shifted from each other by a half cycle, and the control circuit controls a sum of a first ON period of the first switching element in one cycle and a second ON period of the second switching element in one cycle in accordance with the calculated duty command for the first switching element and the calculated duty command for the second switching element, thereby controlling the circuit current, and controls a ratio of the first ON period and the second ON period, thereby controlling voltage of the DC capacitor.

2. The electric power conversion device according to claim 1, wherein the first semiconductor element and the second semiconductor element in the leg part are each composed of a diode.

3. The electric power conversion device according to claim 2, wherein the control circuit controls the switching section, using a first control mode when a voltage absolute value of the AC power supply is lower than voltage of the DC capacitor, and a second control mode when a voltage absolute value of the AC power supply is equal to or higher than voltage of the DC capacitor, in the first control mode, the first ON period of the first switching element and the second ON period of the second switching element ate each equal to or longer than half the drive cycle, and in the second control mode, the first ON period of the first switching element and the second ON period of the second switching element are each equal to or shorter than half the drive cycle.

4. The electric power conversion device according to claim 2, wherein in the case where the drive cycle is T, the control circuit sets the reference phases of the first switching element and the second switching element to phase 0 and phase T/2, respectively, sets a first phase within a half cycle from phase 0 to phase T/2, and sets a second phase within a half cycle from phase T/2 to phase T, and the α-duty command calculation circuit controls the first phase that is set, in accordance with the duty command for the second switching element, and the β-duty command calculation circuit controls the second phase that is set, in accordance with the duty command for the first switching element, thereby controlling the sum and the ratio of the first ON period of the first switching element in one cycle and the second ON period of the second switching element in one cycle.

5. The electric power conversion device according to claim 2, wherein the control circuit generates a current command for the circuit current so that voltage of the smoothing capacitor becomes target voltage and the input power factor from the AC power supply is improved, thereby determining a basic duty command which is an adjustment amount for the first ON period of the first switching element and the second ON period of the second switching element, and through calculations by the α-duty command calculation circuit and the β-duty command calculation circuit, based on the basic duty command and voltage of the DC capacitor, the control circuit generates the duty command for the first switching element and the duty command for the second switching element individually so that the circuit current follows the current command and voltage of the DC capacitor becomes a command value.

6. The electric power conversion device according to claim 1, wherein the first semiconductor element and the second semiconductor element in the leg part are each composed of a switching element, and the control circuit controls the second semiconductor element so that an ON/OFF state thereof is inverted from that of the first switching element, and controls the first semiconductor element so that an ON/OFF state thereof is inverted from that of the second switching element.

7. The electric power conversion device according to claim 6, wherein the control circuit controls the switching section, using a first control mode when a voltage absolute value of the AC power supply is lower than voltage of the DC capacitor, and a second control mode when a voltage absolute value of the AC power supply is equal to or higher than voltage of the DC capacitor, in the first control mode, the first ON period of the first switching element and the second ON period of the second switching element are each equal to or longer than half the drive cycle, and in the second control mode, the first ON period of the first switching element and the second ON period of the second switching element are each equal to or shorter than half the drive cycle.

8. The electric power conversion device according to claim 6, wherein in the case where the drive cycle is T, the control circuit sets the reference phases of the first switching element and the second switching element to phase 0 and phase T/2, respectively, sets a first phase within a half cycle from phase 0 to phase T/2, and sets a second phase within a half cycle from phase T/2 to phase T, and the α-duty command calculation circuit controls the first phase that is set, in accordance with the duty command for the second switching element, and the β-duty command calculation circuit controls the second phase that is set, in accordance with the duty command for the first switching element, thereby controlling the sum and the ratio of the first ON period of the first switching element in one cycle and the second ON period of the second switching element in one cycle.

9. The electric power conversion device according to claim 6, wherein the control circuit generates a current command for the circuit current so that voltage of the smoothing capacitor becomes target voltage and the input power factor from the AC power supply is improved, thereby determining a basic duty command which is an adjustment amount for the first ON period of the first switching element and the second ON period of the second switching element, and through calculations by the α-duty command calculation circuit and the β-duty command calculation circuit, based on the basic duty command and voltage of the DC capacitor, the control circuit generates the duty command for the first switching element and the duty command for the second switching element individually so that the circuit current follows the current command and voltage of the DC capacitor becomes a command value.

10. The electric power conversion device according to claim 1, wherein
the control circuit controls the switching section, using a first control mode when a voltage absolute value of the AC power supply is lower than voltage of the DC capacitor, and a second control mode when a voltage absolute value of the AC power supply is equal to or higher than voltage of the DC capacitor,
in the first control mode, the first ON period of the first switching element and the second ON period of the second switching element are each equal to or longer than half the drive cycle, and
in the second control mode, the first ON period of the first switching element and the second ON period of the second switching element are each equal to or shorter than half the drive cycle.

11. The electric power conversion device according to claim 10, wherein
in the case where the drive cycle is T, the control circuit sets the reference phases of the first switching element and the second switching element to phase 0 and phase T/2, respectively, sets a first phase within a half cycle from phase 0 to phase T/2, and sets a second phase within a half cycle from phase T/2 to phase T,
in the first control mode, the first switching element is turned on at phase 0 and turned off at the second phase, and the second switching element is turned on at phase T/2 and turned off at the first phase,
in the second control mode, the first switching element is turned off at phase 0 and turned on at the second phase, and the second switching element is turned off at phase T/2 and turned on at the first phase, and
the $\alpha$-duty command calculation circuit controls the first phase that is set, in accordance with the duty command for the second switching element, and the $\beta$-duty command calculation circuit controls the second phase that is set, in accordance with the duty command for the first switching element, thereby controlling the sum and the ratio of the first ON period of the first switching element in one cycle and the second ON period of the second switching element in one cycle.

12. The electric power conversion device according to claim 10, wherein
in the case where the drive cycle is T, the control circuit sets the reference phases of the first switching element and the second switching element to phase 0 and phase T/2, respectively, sets a first phase within a half cycle from phase 0 to phase T/2, and sets a second phase within a half cycle from phase T/2 to phase T,
in the first control mode, the first switching element is turned off at phase 0 and turned on at the first phase, and the second switching element is turned off at phase T/2 and turned on at the second phase,
in the second control mode, the first switching element is turned on at phase 0 and turned off at the first phase, and the second switching element is turned on at phase T/2 and turned off at the second phase, and
the $\alpha$-duty command calculation circuit controls the first phase that is set, in accordance with the duty command for the second switching element, and the $\beta$-duty command calculation circuit controls the second phase that is set, in accordance with the duty command for the first switching element, thereby controlling the sum and the ratio of the first ON period of the first switching element in one cycle and the second ON period of the second switching demerit in one cycle.

13. The electric power conversion device according to claim 10, wherein
at a time of switching between the first control mode and the second control mode, the contra circuit inverts an ON/OFF state of each of the first switching element and the second switching element.

14. The electric power conversion device according to claim 10, further comprising a voltage sensor which is connected to the DC capacitor and detects voltage of the DC capacitor, wherein
the control circuit calculates a basic duty command which is an adjustment amount for the first ON period of the first switching element and the second ON period of the second switching element, based on the circuit current detected by the current sensor and a current command for the circuit current, and
the control circuit controls the switching section based on a polarity of the calculated basic duty command and a magnitude relationship between the voltage of the DC capacitor detected by the voltage sensor and a command value for controlling the voltage of the DC capacitor.

15. The electric power conversion device according to claim 1, wherein
in the case where the drive cycle is T, the control circuit sets the reference phases of the first switching element and the second switching element to phase 0 and phase T/2, respectively, sets a first phase within a half cycle from phase 0 to phase T/2, and sets a second phase within a half cycle from phase T/2 to phase T, and
the $\alpha$-duty command calculation circuit controls the first phase that is set, in accordance with the duty command for the second switching element, and the $\beta$-duty command calculation circuit controls the second phase that is set, in accordance with the duty command for the first switching element, thereby controlling the sum and the ratio of the first ON period of the first switching element in one cycle and the second ON period of the second switching element in one cycle.

16. The electric power conversion device according to claim 15, wherein
the control circuit sets an initial value of the first phase so that an increase amount and a decrease amount of the circuit current in the half cycle from phase 0 to phase T/2 are equal to each other, and sets an initial value of the second phase so that an increase amount and a decrease amount of the circuit current in the half cycle from phase T/2 to phase T are equal to each other, and
through calculations by the $\alpha$-duty command calculation circuit and the $\beta$-duty command calculation circuit, based on voltage of the DC capacitor and the circuit current, the control circuit adjusts one of the first phase and the second phase from the initial value thereof, and holds the other one at the initial value thereof.

17. The electric power conversion device according to claim 16, wherein
the control circuit calculates a basic duty command which is an adjustment amount for the first ON period of the first switching element and the second ON period of the second switching element, based on the circuit current detected by the current sensor and a current command for the circuit current, and
based on a polarity of the calculated basic duty command and a magnitude relationship between the voltage of the DC capacitor detected by the voltage sensor and a command value for controlling the voltage of the DC capacitor, the control circuit selects one, of the first phase and the second phase, that is adjusted from the initial value thereof, the control circuit adds the basic duty command to the initial value of the selected one of the first phase and the second phase, and holds the other one at the initial value thereof, and the control circuit controls the switching section based on the duty command for one of the first switching element and the second switching element, to which the basic duty command has been added, and the duty command for the other one of the first switching element and the second switching element, which is held at the initial value.

18. The electric power conversion device according to claim 1, wherein the control circuit generates a current command for the circuit current so that voltage of the smoothing capacitor becomes target voltage and the input power factor from the AC power supply is improved, thereby determining a basic duty command which is an adjustment amount for the first ON period of the first switching element and the second ON period of the second switching element, and through calculations by the α-duty command calculation circuit and the β-duty command calculation circuit, based on the basic duty command and voltage of the DC capacitor, the control circuit generates the duty command for the first switching element and the duty command for the second switching element individually so that the circuit current follows the current command and voltage of the DC capacitor becomes a command value.

19. The electric power conversion device according to claim 1, wherein a command value for controlling voltage of the DC capacitor is set to half the target voltage of the smoothing capacitor.

20. The electric power conversion device according to claim 1, further comprising:

a voltage sensor corrected to the DC capacitor that detects the voltage across the DC capacitor, and the control circuit further controls the sum of the first ON period of the first switching element in one cycle and the second ON period of the second switching element in one cycle, in accordance with the calculated duty command for the first switching element and the calculated duty command for the second switching element, thereby controlling the circuit current, and controls the ratio of the first ON period and the second ON period based on the voltage of the DC capacitor detected by the voltage sensor, thereby controlling the voltage of the DC capacitor.

* * * * *